US011307730B2

(12) United States Patent
Lee

(10) Patent No.: US 11,307,730 B2
(45) Date of Patent: Apr. 19, 2022

(54) PERVASIVE 3D GRAPHICAL USER INTERFACE CONFIGURED FOR MACHINE LEARNING

(71) Applicant: Wen-Chieh Geoffrey Lee, Taipei (TW)

(72) Inventor: Wen-Chieh Geoffrey Lee, Taipei (TW)

(*) Notice: Subject to any disclaimer, the term of this patent is extended or adjusted under 35 U.S.C. 154(b) by 0 days.

(21) Appl. No.: 16/164,928

(22) Filed: Oct. 19, 2018

(65) Prior Publication Data

US 2020/0125234 A1    Apr. 23, 2020

(51) Int. Cl.
| | |
|---|---|
| G06F 3/0481 | (2013.01) |
| G06F 3/04815 | (2022.01) |
| G06K 9/62 | (2022.01) |
| G06T 15/20 | (2011.01) |
| G06T 7/246 | (2017.01) |
| G06F 3/0346 | (2013.01) |
| G06V 10/94 | (2022.01) |

(52) U.S. Cl.
CPC ........ *G06F 3/04815* (2013.01); *G06F 3/0346* (2013.01); *G06K 9/628* (2013.01); *G06K 9/6217* (2013.01); *G06K 9/6269* (2013.01); *G06T 7/246* (2017.01); *G06T 15/20* (2013.01); *G06T 2207/20084* (2013.01); *G06T 2207/30241* (2013.01); *G06V 10/94* (2022.01)

(58) Field of Classification Search
CPC .... G06F 17/16; G06F 3/04815; G06F 3/0484; G06T 19/003
See application file for complete search history.

(56) References Cited

U.S. PATENT DOCUMENTS

| | | | |
|---|---|---|---|
| 4,835,528 A | 5/1989 | Flinchbaugh | |
| 5,798,761 A | 8/1998 | Isaacs | |
| 5,825,945 A | 10/1998 | Stolis et al. | |
| 6,078,312 A | 6/2000 | Liebenow | |

(Continued)

FOREIGN PATENT DOCUMENTS

| | | |
|---|---|---|
| EP | 1 113 385 | 7/2001 |
| EP | 1 473 623 | 11/2004 |

(Continued)

OTHER PUBLICATIONS

Photonics Rules of Thumb, Optics, Electro-Optics, Fiber Optics, and Lasers, by John Lester Miller & Ed Friedman, McGraw-Hill Copyright 1996, ISBN 0-07-044329-7, pp. 297-298 and pp. 306-307.

(Continued)

*Primary Examiner* — Chun-Nan Lin
(74) *Attorney, Agent, or Firm* — Saile Ackerman LLC; Stephen B. Ackerman

(57) ABSTRACT

A three-dimensional graphical user interface (3D GUI) configured to be used by a computer, a display system, an electronic system, or an electro-mechanical system. The 3D GUI provides an enhanced user-engaging experience while enabling a user to manipulate the motion of an object of arbitrary size and a multiplicity of independent degrees of freedom, using sufficient degrees of freedom to represent the motion. The 3D GUI includes the functionality of machine learning (ML), which uses support vector machine (SVM) and/or convolutional neural network (CNN) to provide intelligent control of robot kinematics and computer graphics as well as the ability of the user to more quickly learn the more subtle applications of 3D computer graphics.

11 Claims, 10 Drawing Sheets

(56) References Cited

U.S. PATENT DOCUMENTS

Figure 1A:
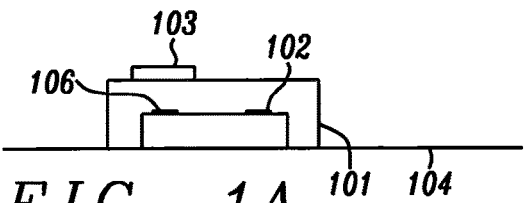

| | | | |
|---|---|---|---|
| 6,392,632 B1* | 5/2002 | Lee | G06F 3/03543 |
| | | | 345/156 |
| 6,697,053 B2 | 2/2004 | Kajihara | |
| 6,720,949 B1 | 4/2004 | Pryor et al. | |
| 6,844,871 B1 | 1/2005 | Hinckley et al. | |
| 7,019,733 B2 | 3/2006 | Koay | |
| 7,081,612 B1 | 7/2006 | Lu | |
| 7,161,682 B2 | 1/2007 | Xie et al. | |
| 7,301,531 B2 | 11/2007 | Wu | |
| 7,321,359 B2 | 1/2008 | Xie et al. | |
| 7,355,160 B2 | 4/2008 | Cheah et al. | |
| 7,439,954 B2 | 10/2008 | Theytaz et al. | |
| 7,656,395 B2 | 2/2010 | Pope et al. | |
| 7,872,639 B2 | 1/2011 | Theytaz et al. | |
| 7,924,266 B2 | 4/2011 | Larsen | |
| 8,077,147 B2 | 12/2011 | Krah et al. | |
| 8,279,279 B2 | 10/2012 | Hattori et al. | |
| 8,291,322 B2 | 10/2012 | Klappert et al. | |
| 8,527,896 B2 | 9/2013 | Matthews et al. | |
| 8,553,235 B1* | 10/2013 | Lee | G01B 11/14 |
| | | | 356/614 |
| 8,736,561 B2 | 5/2014 | Anzures et al. | |
| 8,954,887 B1 | 2/2015 | Tseng et al. | |
| 9,189,254 B2 | 11/2015 | Kushman et al. | |
| 9,405,430 B2 | 8/2016 | Ullmann | |
| 9,690,446 B2 | 6/2017 | Forstall et al. | |
| 9,703,396 B2 | 7/2017 | Lee | |
| 9,720,525 B2 | 8/2017 | Lee | |
| 9,733,727 B2 | 8/2017 | Lee | |
| 9,904,874 B2 | 2/2018 | Shoaib et al. | |
| 2004/0088289 A1* | 5/2004 | Xu | G06F 16/7834 |
| 2006/0066572 A1 | 3/2006 | Yumoto et al. | |
| 2006/0132443 A1 | 6/2006 | Chien Wu | |
| 2008/0036773 A1 | 2/2008 | Bae | |
| 2009/0102793 A1 | 4/2009 | Bohn et al. | |
| 2009/0153486 A1 | 6/2009 | Bohn | |
| 2009/0160772 A1 | 6/2009 | DePue et al. | |
| 2009/0262071 A1 | 10/2009 | Yoshida | |
| 2010/0001950 A1 | 1/2010 | Fouquet et al. | |
| 2010/0036393 A1 | 2/2010 | Unsworth | |
| 2010/0261526 A1* | 10/2010 | Anderson | G06F 3/017 |
| | | | 463/31 |
| 2011/0234815 A1 | 9/2011 | Zahnert et al. | |
| 2011/0304541 A1 | 12/2011 | Dalal | |
| 2013/0002555 A1* | 1/2013 | Lee | G06F 3/042 |
| | | | 345/166 |
| 2013/0241835 A1* | 9/2013 | Lee | G06F 3/03543 |
| | | | 345/166 |
| 2014/0201670 A1 | 7/2014 | Mallya et al. | |
| 2014/0354548 A1* | 12/2014 | Lee | G06F 3/0317 |
| | | | 345/166 |
| 2015/0127031 A1 | 5/2015 | Yagi et al. | |
| 2015/0317792 A1 | 11/2015 | Wiemker et al. | |
| 2016/0059412 A1 | 3/2016 | Oleynik | |
| 2017/0076194 A1 | 3/2017 | Versace | |
| 2017/0103584 A1 | 4/2017 | Vats | |
| 2017/0299676 A1 | 10/2017 | Anderson et al. | |
| 2018/0082119 A1* | 3/2018 | Zilberman | G06K 9/00671 |
| 2019/0138194 A1 | 5/2019 | Ryan | |

FOREIGN PATENT DOCUMENTS

| | | |
|---|---|---|
| EP | 1 804 154 | 7/2007 |
| WO | WO 2006/053271 | 5/2006 |
| WO | WO 2006/137077 | 12/2006 |
| WO | WO 2011/028620 | 3/2011 |

OTHER PUBLICATIONS

Optics, Fourth Edition, International Edition, by Eugene Hecht, Adelphi University, Copyright 2002, Pearson Education Inc., Chapter 4, 11 pgs.

"Capacitive Proximity Sensing Using the FDC1004," by David Wang, Texas Instruments, Application Report SNOA928—Mar. 2015, 9 pgs.

"Determining Shape and Reflectance of Lambertian, Specular, and Hybrid Surfaces using Extended Sources," by Shree K. Nayar et al., International Workshop on Industrial Applications of Machine Intelligence and Vision (MIV-89), Tokyo, Apr. 10-12, 1989, pp. 169-175.

Labshpere, A HALMA Company, Technical Guide, Reflectance Materials and Coatings, North Sutton, NH 03260 USA, Jan. 1, 1991, 25 pgs.

"Xerox PARC Develops Hyperspectral Imager," by Vladimir Koifman, Image Sensors World, Oct. 27, 2015, 4 pgs., http://image-sensors-world.blogspot.tw/2015/10/xerox-parc-develops-hyperspectral-imager.html.

European Search Report, Application No. 13368043.9—1972 / 2741179, Applicant: Wen-Chieh, Geoffrey Lee, dated Mar. 31, 2015, 11 pgs.

"About BlueTrack Technology," Bluetrack Technology in a Computer Mouse/Microsof Hardware, pp. 1-3, found: http://www.microsoft.com/hardware/en-us/bluetrack-technology, Sep. 14, 2011.

"Metamerism (color)," from Wikipedia, the free encyclopedia, pp. 1-4, http://en.wikipedia.org/wiki/Metamerism_(color), Jul. 14, 2011.

European Search Report, Application: No. 13 368 011.6—1959, Applicant: Wen-Chieh, Geoffrey Lee, dated Nov. 8, 2016, 7 pgs.

"Hyperspectral imaging with a liquid crystal polarization interferometer," by Alex Hegyi et al., Copyright 2015 Optical Society of America, 13 pgs., Optics Express vol. 23, Issue 22, p. 28742-28754 (2015), Received: Jul. 22, 2015, https://doi.org/10.1364/OE.23.028742.

"Ink-Paper Interaction, A study in ink-jet color reproduction," Linkoping Studies in Science and Technology Dissertations No. 806, by Li Yang, Apr. 2003, Linkoping University, Sweden, pp. 13 and 14, ISBN 91-7373-613-9.

"Sensing angular change through a small optical window," by Tim Poston et al., May 29, 2006, pp. 1-18, found: www.mit.edu/~srimano/papers/3DoFSensing.pdf.

"Sensing Linear and Angular Change Through a Small Optical Window," by Tim Poston et al., pp. 1-9, found Oct. 3, 2013, htp://www.mit.edu/~srimano/research/mushaca/SLA.htm.

Principles of Color Technology, Third Edition, by Roy S. Berns, John Wiley & Sons, Inc, New York, pp. 56-57, Copyright 2000.

Partial European Search Report, Application No. EP 14 36 8025, Search date: Feb. 27, 2015, Munich, 3 pages.

"Inside the Trackpad: a BlackBerry Science Lesson," Inside BlackBerry, The Offical BlackBerr Blog, found: BlackBerryBlog #Five TipFriday: #BlackBerry social, Dec. 18, 2009, 2 pgs.

"HTC Touch Diamond vs. Samsung i900 Omnia: Head-to-Head," HTC Status, found: http://www.gsmarena.com/htc_touch_diamond_vs_samsung_i900_om . . . Jul. 2, 2008, 2 pgs.

"Brace yourself for the era of the 'fingermouse'," by Stephen Shankland, Deep Tech—CNET News, pp. 1-4, Mar. 25, 2010, found: http://news.cnet.com/8301-30685_3-20001191-264.html.

"Samsung Launches 'Optical Joystick Phone," by Allen Tsai, Dec. 20, 2006, found: http://www.mobiledia.com/news/54829.html, pp. 1-4.

"Review of CMOS image sensor," by M. Bigas, et al., Microelectronics Journal 37, Sep. 6, 2005, pp. 433-451, www.elsevier.com/locate/mejo.

"CMOS Image Sensor for High Speed Applications," by Munir El-Desouki, et al., Sensors, Jan. 13, 2009, pp. 430-444, doi: 10.3390/s90100430, www.mdpi.com/journal/sensors, ISSN 1424-8220.

"TwistMouse for Simultaneous Translation and Rotation," by Jacqui Hannagan, A dissertation submitted for the partial fultulment of the requirements for the degree of Bachelor of Commerce (Honours), at the University of Otago, Dunedin, New Zealand, Nov. 14, 2007, pp. 1-117.

"AdvancED Game Design with Flash," by Rex Van Der Spuy, an Apress company, Copyright 2010, 38 pages, introduction and p. 306.

"Deep Video Portraits," by Michael Zollhofer, Siggraph 2018, pp. 1-4, found Nov. 20, 2018: https://web.stanford.edu/~zollheof/papers/SG2018_DeepVideo/pag . . . .

(56) References Cited

OTHER PUBLICATIONS

"Support-Vector Networks," by Corinna Cortes et al., Copyright 1995 Kluwer Academic Publishers, Boston. Machine Learning, 20, 273-297, pp. 273-297.
"Visualization of multidimensional and multimodal tomographic medical imaging data, a case study," by Yan Zhang et al., Philosophical Transactions of the Royal Society A, (2009) 367, Aug. 13, 2009, pp. 3121-3148.
U.S. Office Action, U.S. Appl. No. 16/056,752, Applicant: Lee, Wen-Chieh Geoffrey, dated Dec. 18, 2020, 72 pages.
U.S. Office Action, U.S. Appl. No. 16/456,009, Applicant: Wen-Chieh Geoffrey Lee, dated Mar. 9, 2021, 38 pages.
U.S. Notice of Allowance, U.S. Appl. No. 16/456,009, Applicant: Wen-Chieh Geoffrey Lee, dated Sep. 27, 2021, 12 pages.

* cited by examiner

PERVASIVE 3D GRAPHICAL USER INTERFACE CONFIGURED FOR MACHINE LEARNING

1. RELATED APPLICATIONS

The present disclosure relates to the following US patent applications and US Patents, all of which are owned by the owner of the instant application, and all of which are incorporated by reference in their entirety: U.S. Pat. No. 9,720,525, filed on May 29, 2012, Ser. No. 13/834,085, filed on Mar. 15, 2013, U.S. Pat. No. 9,733,727, filed on Oct. 17, 2013, Ser. No. 14/294,369, filed on Jun. 3, 2014, U.S. Pat. No. 9,703,396, filed on Jul. 12, 2013, and Ser. No. 16/056,752, filed on Aug. 7, 2018.

2. TECHNICAL FIELD

The present disclosure relates to a three-dimensional graphical user interface (3D GUI) for a computer, an electronic display, a control system or an electro-mechanical system that incorporates artificial intelligence feature in its data processing module. Through the use of these AI features the 3D GUI renders pervasive and user-engaging graphical scenery that includes such graphics effects as occlusion and morphing. Using a high resolution and high sensitivity 3D navigational device, whose functionality is fully disclosed by Ser. No. 14/294,369 which is fully incorporated herein by reference, the 3D GUI provides an absolute address and linear and non-linear motion vectors for describing and displaying the motion of a 3-dimensional (3D) object with at least three independent degrees of freedom and moving in accord with three-dimensional kinematics and visualized in a graphic rendering device. When the presently disclosed 3D GUI analyzes a plurality of neural signals which can be mapped onto a displaying device used by the 3D GUI. The performance of the 3D GUI is greatly enhanced by its ability to use 3D graphics in a 2.5D coordinate system, using a 3D zone whose profile or dimension is defined by said 3-dimensional (3D) object; the level of engagement between the user and the computer which carries such a 3D GUI thus is augmented.

3. BACKGROUND

A Graphical User Interface (GUI) generally denotes a software module embedded in an electronic system such as a computer or, more specifically, in its operating system, or embedded in a cloud of servers. The ultimate object of the GUI is to enable its user to engage with the graphical features presented in a displaying device associated with the electronic system, such as icons, menu bars, title bars or ribbons. In a broader sense, said graphical features comprise the ones that are generated by both graphical vectors as well as the ones that are acquired or measured by an instrument (e.g. a raster scanned image). In an even broader sense, a GUI can not only provide these graphical features to a user, but it can also provide the user with access to non-graphical functionalities, such as audio, speech recognition, fingerprint reading, intelligent agents, robotic manipulation, the use of advanced techniques of analysis such as machine learning or neural networks, the use of automated functions such as turning an electronic device on or off, or even surveying the habits/desires of a user. We consider a well-designed GUI to be one that engages its user(s) relatively easily, initiating many intuitive/direct interactions. For decades, the GUI of a computer has been in two-dimensional (2D) format (e.g. its icons, cursors, etc., are all in 2D format). In recent years, the computer industry has started embracing two streams of innovations, i.e., 3D digital graphics, and artificial intelligence. With the arrival of the era of 3D digital graphics, there has been a corresponding need for the development of a user-engaging type of 3D GUI, allowing for new features such as moving a 3D cartoon character or manipulating a robot following the instruction of the user, all in an intuitive, direct, real-time, and intelligent manner. The arrival of the artificial intelligence technique further augment the fundamental capability of said 3D GUI, making the interactions between a computer and its user even more versatile and efficient. The prior arts disclose many approaches to improving the design and versatility of GUI's, but these efforts do not provide the capabilities to be presented herein. For example, Ullman (U.S. Pat. No. 9,405,430) discloses a GUI that includes a menu tree to reduce the distance that a cursor has to move during an instruction selecting process. Anzures (U.S. Pat. No. 8,736,561) discloses a method of adjusting properties, content or context of a graphical object. Tseng (U.S. Pat. No. 8,954,887) discloses a GUI that pops-up a new window when a touch-sensitive screen is pressed for an extended period of time. Kushman (U.S. Pat. No. 9,189,254) discloses an automated tool that can interact with a plurality of users on web server through the use of a GUI by each user. Fostall (U.S. Pat. No. 9,690,446) discloses a plurality of profiles of finger gestures that are detected by a touch-sensitive display panel to make the use of a GUI more intuitive. Matthews (U.S. Pat. No. 8,527,896) discloses a GUI having an icon that can be made to visually hover over other icons so that the user is informed that the position of his cursor is over that icon. Mohammed (U.S. Pat. No. 9,904,874) discloses a neural network system that provides a time-domain-to-frequency-domain converter for the input signals prior to extracting features from the input signals as a means of reducing the loading on the processors of the neural network system.

Figure 1B:
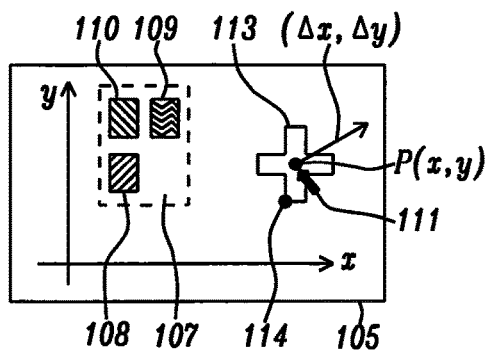
Figure 1C:
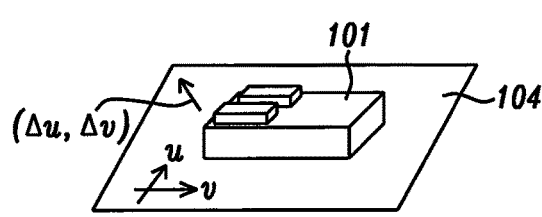
Figure 1D:
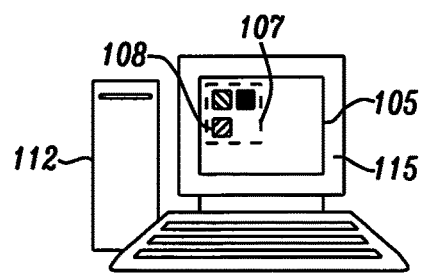

FIG. 1D schematically shows a conventional two-dimensional (2D) graphical displaying device (115) such as a monitor. FIG. 1D also shows that the GUI (105) that is applied to the displaying device (115) is also a 2D GUI. Correspondingly, as FIG. 1D further shows, the formats of the graphical features (e.g. icon 108) within that GUI (105) are also in a 2D format. Based on this 2D design correspondence, the motion vector provided by the conventional navigational device (such as a mouse) shown in FIG. 1A (101) is in 2D format as well, as further shown in FIG. 1C. During operation, a user moves a navigational device (101), such as a mouse, on a two-dimensional (2D) planar reference surface, such as a mouse pad or a desktop surface (104). The mouse (101) compares a series of images of the surface captured by its image sensor (102) as it moves along the reference plane (104) and sends relative motion vectors to the electronic system or to a cloud of servers (i.e., a group of servers linked by a network, such as the internet, or a means of equivalent effect). Upon the receipt of the motion vector data by the computer shown in FIG. 1D (112), the cursor, shown as (111) in FIG. 1B, will be moved on the 2D GUI (105) accordingly. In further detail, as FIG. 1C shows, when the mouse (101) is moved on a mouse pad or a desktop surface (104) by a 2D motion vector with components ($\Delta u$, $\Delta v$), it creates a corresponding positional motion vector ($\Delta x$, $\Delta y$) of the cursor (111) that appears on the 2D GUI (105). When a conventional 2D navigational device (101) is used by a 3D GUI, such as the one that will be described herein and which is pictured schematically for reference hereinafter as (207) in FIG. 2A, several technological challenges will be encountered: first, a significant amount of CPU (central processing unit) or GPU (graphic processing unit) power will be consumed by the matrix (i.e., array, tensor) transformation process required for the 2D mouse data to be converted to a 3D format for the subsequent use by the 3D GUI. Secondly, perhaps even more importantly, the conventional 2D mouse (101) cannot provide the angular displacement data for a 3D GUI. Lastly, there is a major limitation on the conventional 2D navigational device (101) in that it lacks a comprehensive means to provide a depth value (z). A further shortcoming of the conventional 2D GUI and a fundamental strength of the present 3D GUI, is the ability to control a device such as a robot which is 3-dimensional and has many degrees of freedom. Such a robot is shown in FIG. 3. In the present 3D GUI, the end effector of said robot can be envisioned as a 3D cursor. When the degrees of freedom of said robot is very high, it denotes that the interaction between said 3D cursor and the object carried by said 3D GUI is very complicated. Under this circumstance, using the artificial intelligence process module (610) can rapidly derive the resultant motions/status of said 3D object, i.e., it can help the presently disclosed 3D GUI derive the output signal of a neural network at a speed and accuracy much higher than those of the prior art. Buttressed up by this innovative feature, new applications such as a user engaging video game, an interactive cartoon that carries future proof capability, or an intelligent diagnosis systems for medical images, etc. can reach a performance that is unprecedented to the prior art.

4. SUMMARY

To address the shortcomings of conventional GUI, it is an object of the present disclosure to provide a "pervasive" (i.e., comprehensive and fully integrated) 3-dimensional graphical user interface (3D GUI) for a computer, electronic control system, or electro-mechanical system that enhances the user's engagement experience by allowing the user to manipulate the motions of an object by sufficient degrees of freedom, regardless of its size, e.g. from an object as small as a single pixel to one that is as large as a network of computers. For all future reference herein, the 3D GUI provided by this disclosure is the one represented schematically as (207) in FIG. 2A It will hereinafter simply be referred to as "the presently disclosed 3D GUI" or, more simply, the 3D GUI.

To achieve the above object, the 3D GUI will provide absolute addresses and linear and non-linear motion vectors for a 3D object, enabling a user to gain an extraordinary and "transparent" experience of engaging directly with that 3D object so that there is no conscious experience that a GUI is being used. Further, when providing input to the 3D GUI by using the high resolution and high sensitivity 3D navigational device, whose functionality is fully disclosed by Ser. No. 14/294,369 which is fully incorporated herein by reference (and will be further discussed below), the presently disclosed 3D GUI will provide its fullest capabilities and advantages. It will then be able to provide an absolute address for an object and the positional accuracy of that object will be kept constant during the entirety of its motion, instead of the accuracy of the motion continually deteriorating as a result of successive approximations. This motional accuracy is a result of the 3D navigational device being moved on a specially tinted reference surface. Still further, the presently disclosed 3D GUI can provide a 2.5D coordinate system (a 2D system with a separate rotational axis) to help the user learn by interacting with 3D scenery, i.e., renderings that are created using 3D vector graphics. By manipulating a perspective angle by moving a world space camera using linear and non-linear motion vectors in six degrees of freedom, the 3D GUI is able to classify a plurality of 3D graphical vectors into several classes, i.e., the basic graphical entities that are used to construct the 3D vector graphics and/or 3D motion vectors selected for denoting the levels of user engagement.

5. BRIEF DESCRIPTION OF DRAWINGS

Figure 2A:
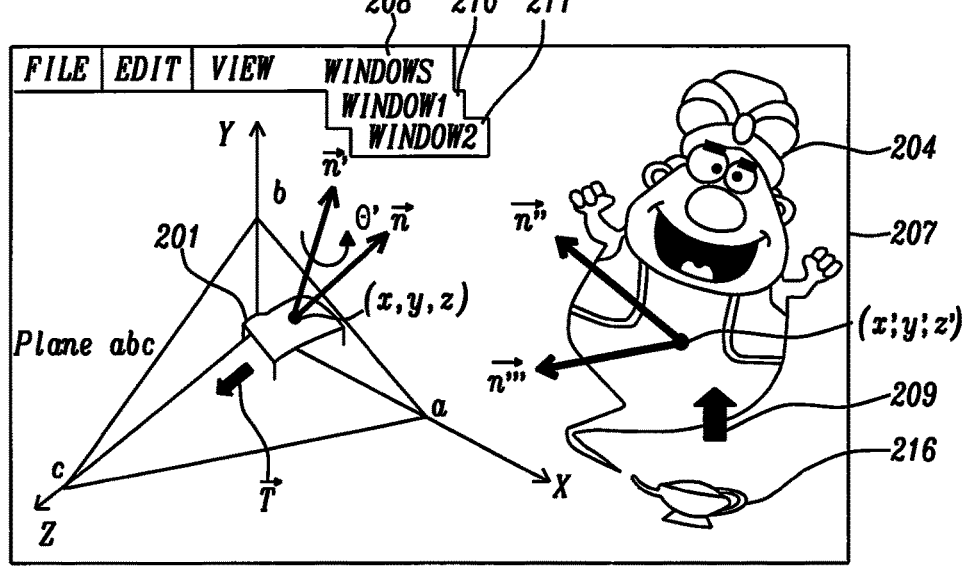
Figure 3A:
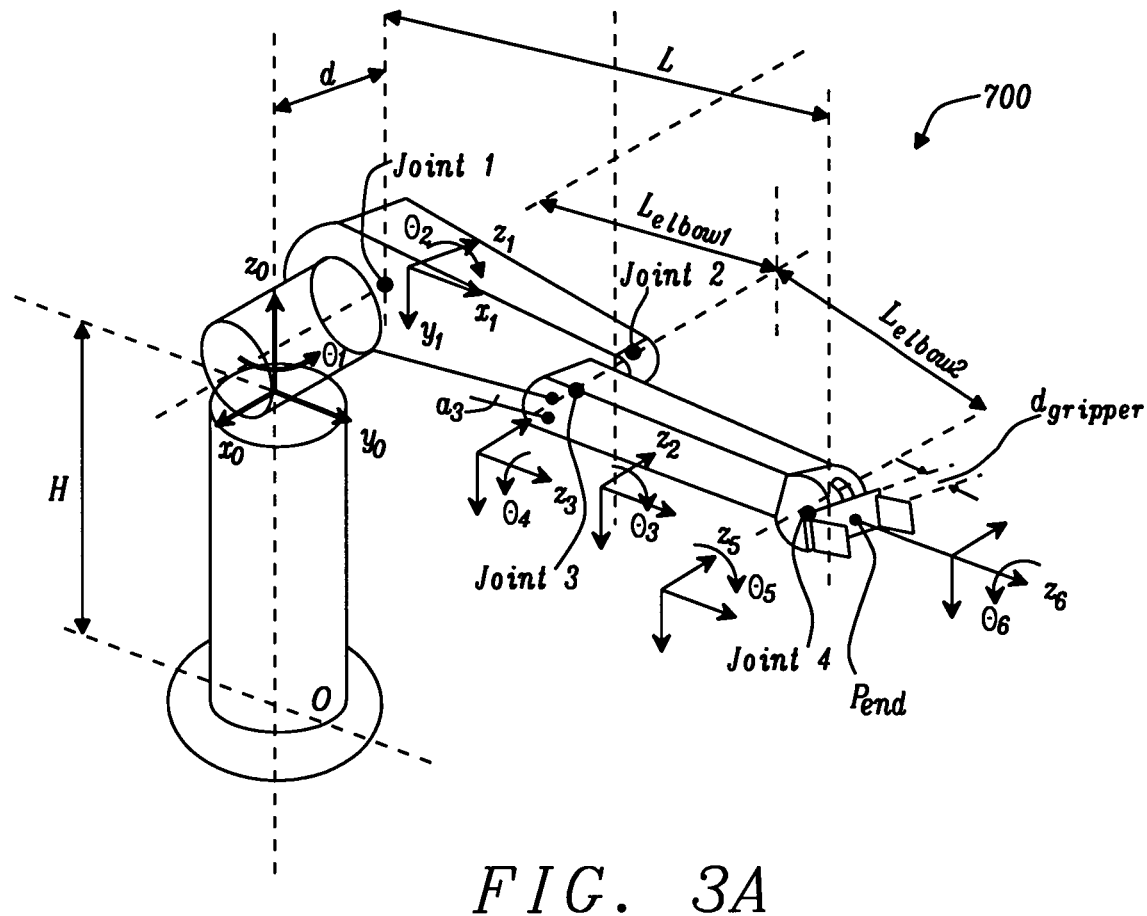
Figure 3B:
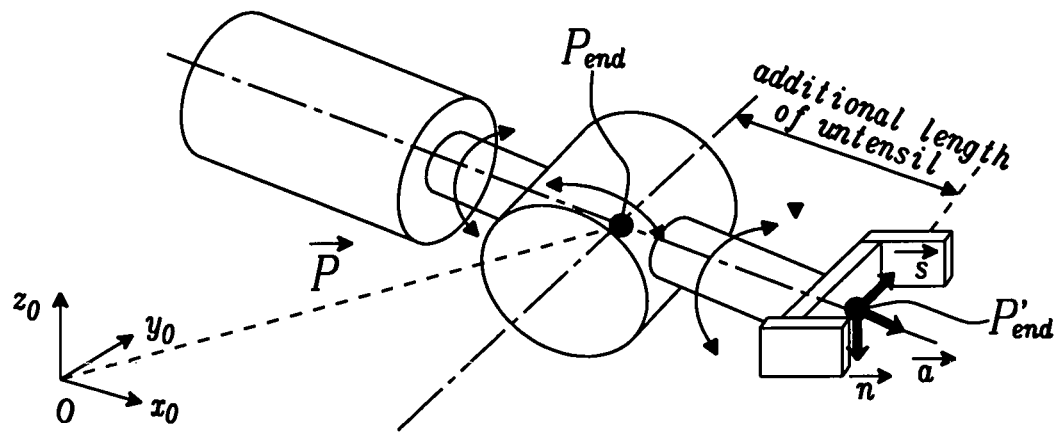

FIGS. 1A, B, C, and D schematically depict elements associated with a conventional 2D GUI that uses a 2D navigational device to maneuver a cursor;

FIGS. 2A, B, C and D schematically depicts elements associated with the presently disclosed 3D GUI that uses a 3D navigational device to provide 3D motion vectors for an object having six degrees of freedom (DOF);

FIG. 3A schematically shows a robot that can be directly manipulated by the presently disclosed 3D GUI;

FIG. 3B shows an alternative structure of the end of the arm of the robot of FIG. 3A which has a different set of descriptive coordinates corresponding to a different set of matrices.

Figure 4A:
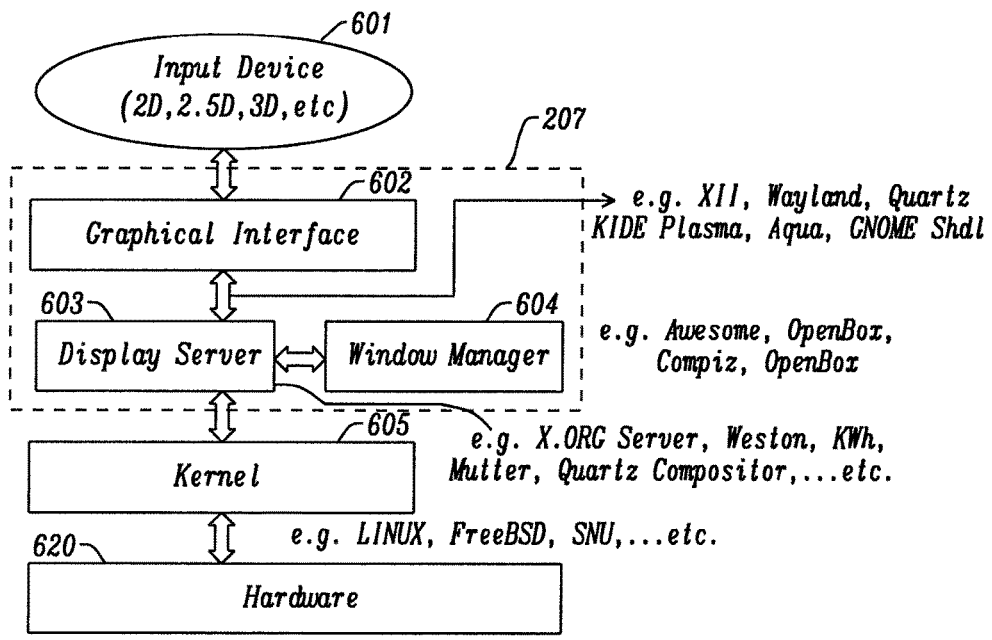
Figure 4B:
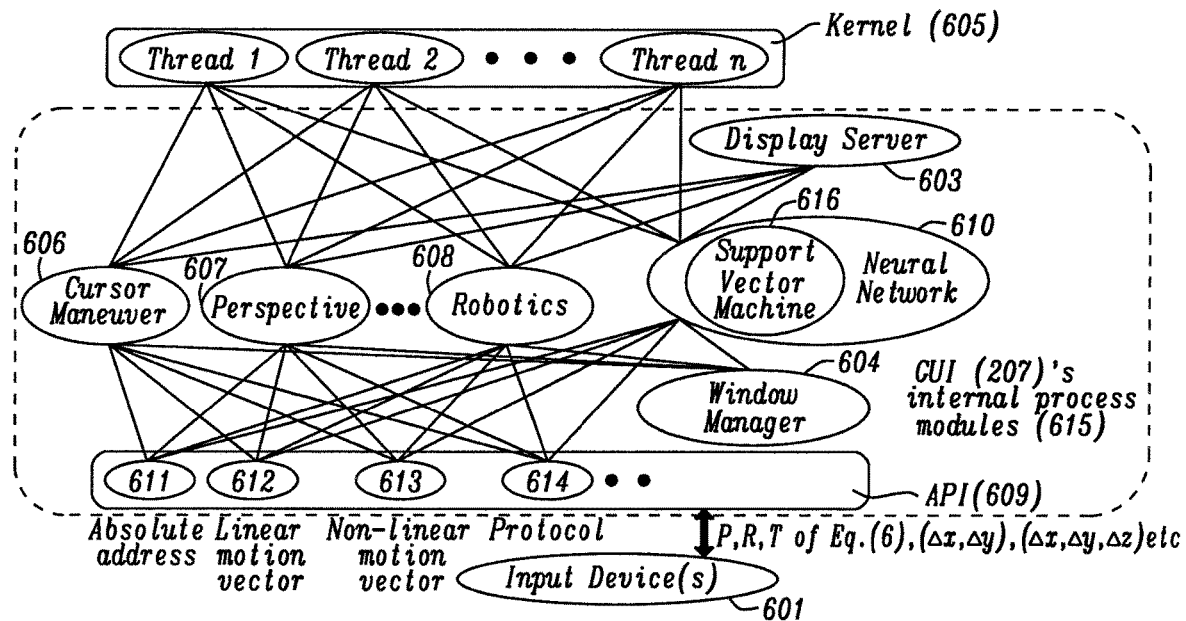
Figure 4C:
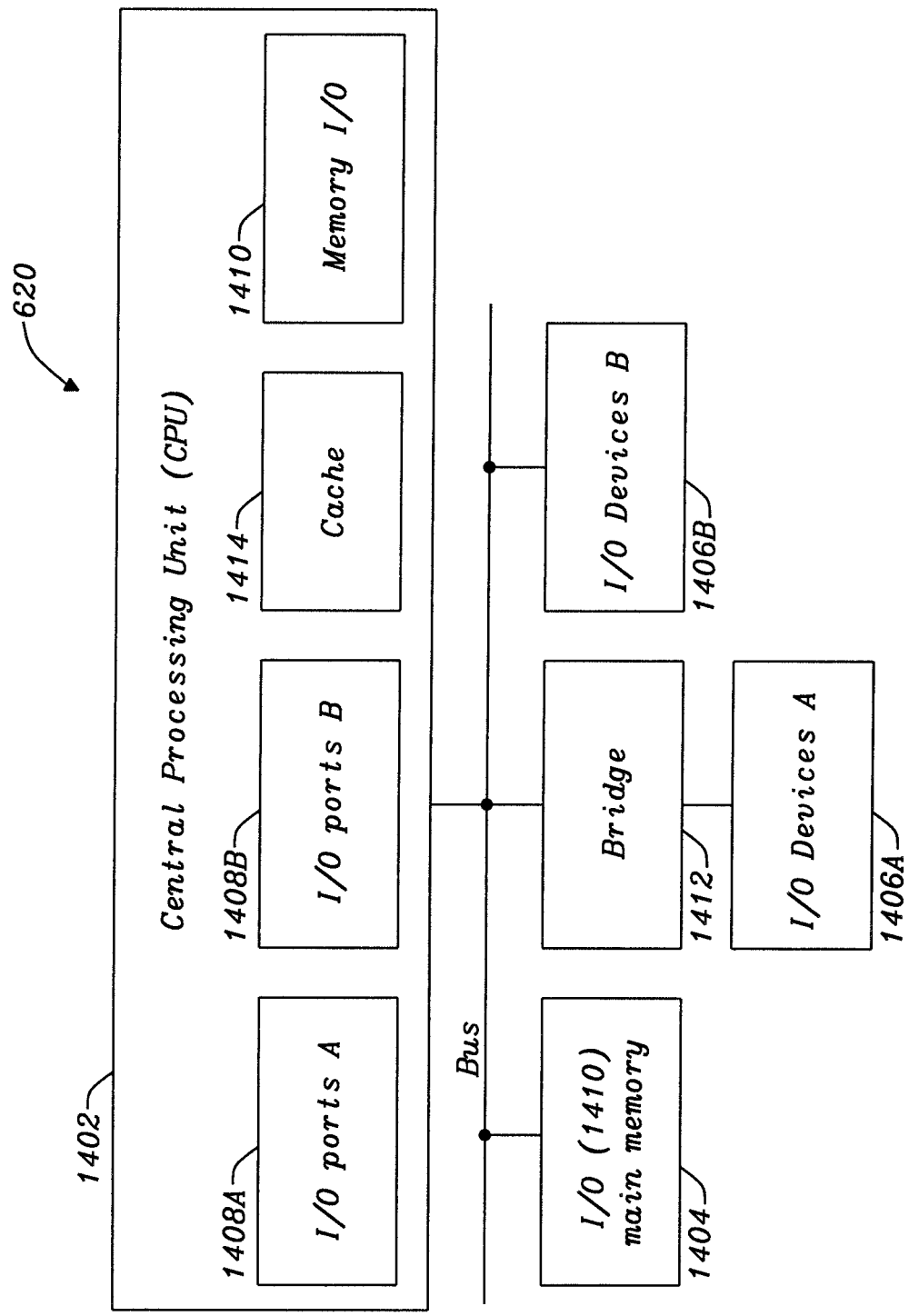

FIG. 4A schematically shows layers of the 3D GUI based on a windowing system, in which a specific GUI layer maybe positioned between the input device and the kernel of an operating system, designed for controlling user's viewing experience; several vendors in this market segment are also listed;

FIG. 4B schematically shows application interface (API) that bridges different types of input devices with the presently disclosed 3D GUI;

FIG. 4C illustrates a hardware environment in which the present 3D GUI operates.

Figure 5A:
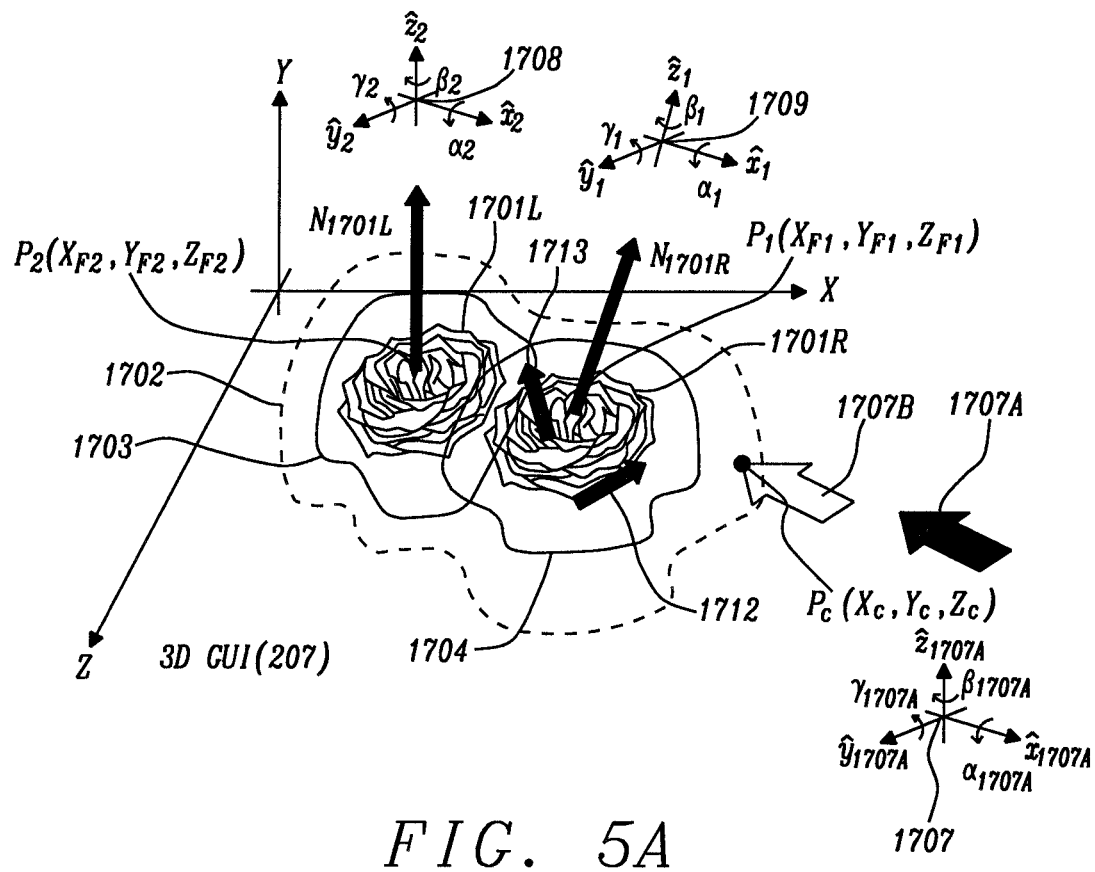
Figure 5B:
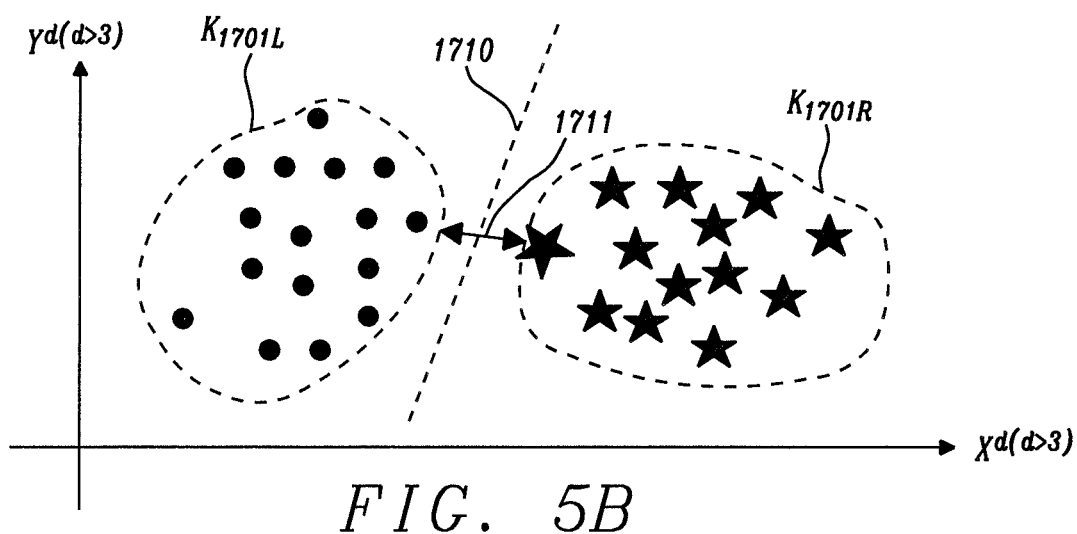
Figure 5C:
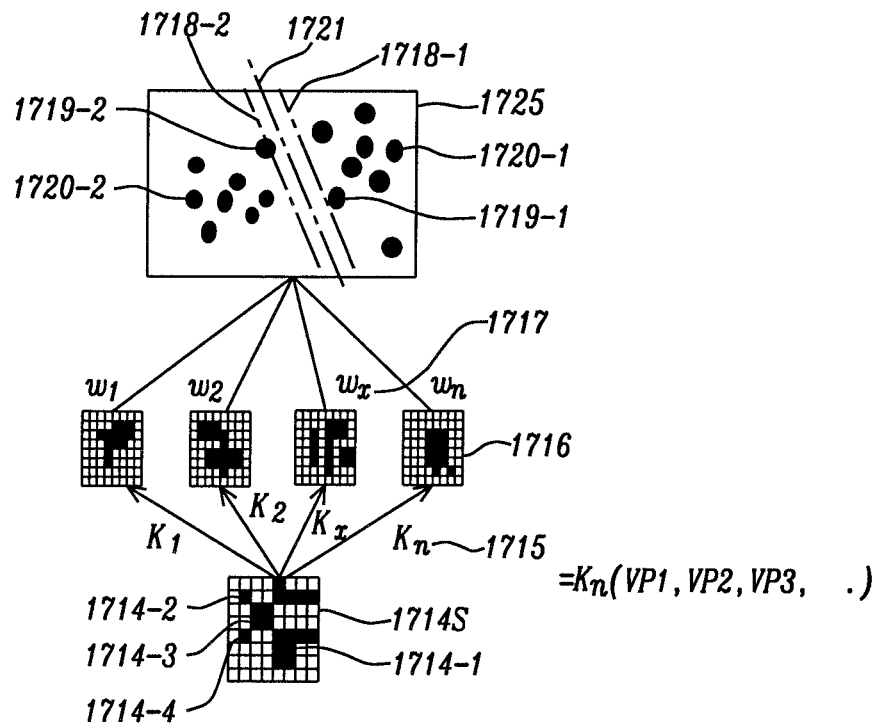
Figure 5D:
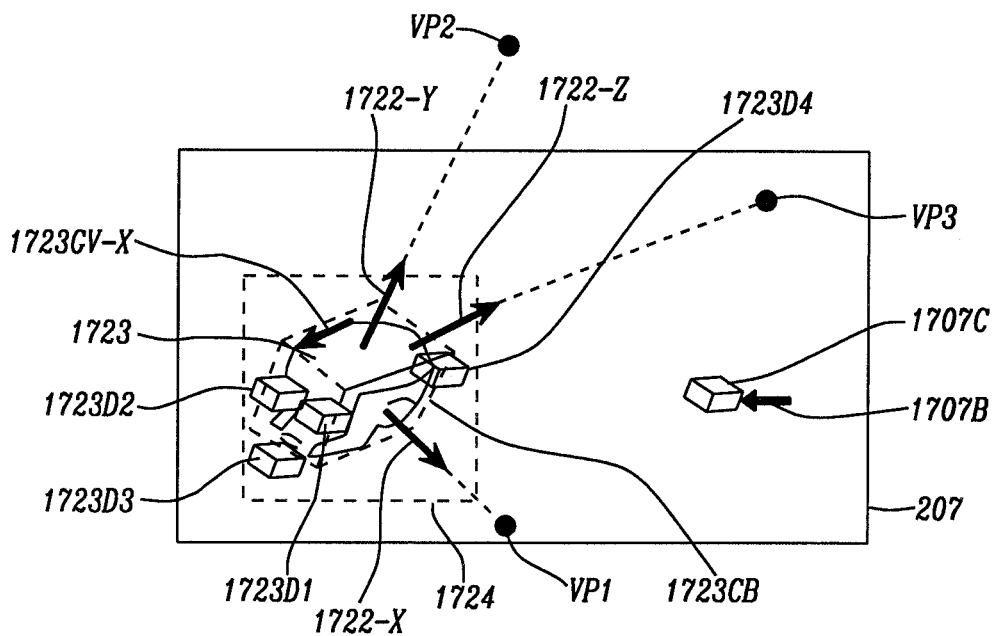
Figure 6:
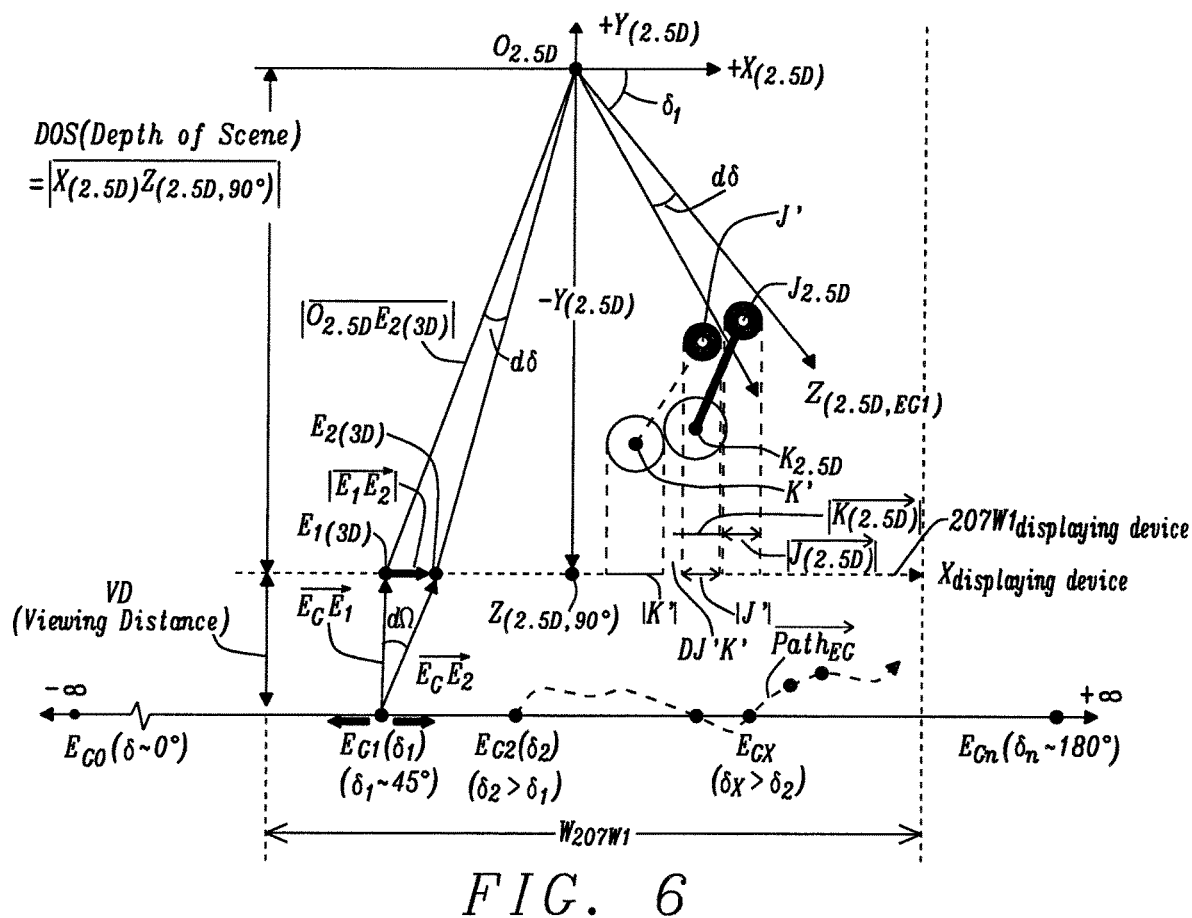
Figure 7:
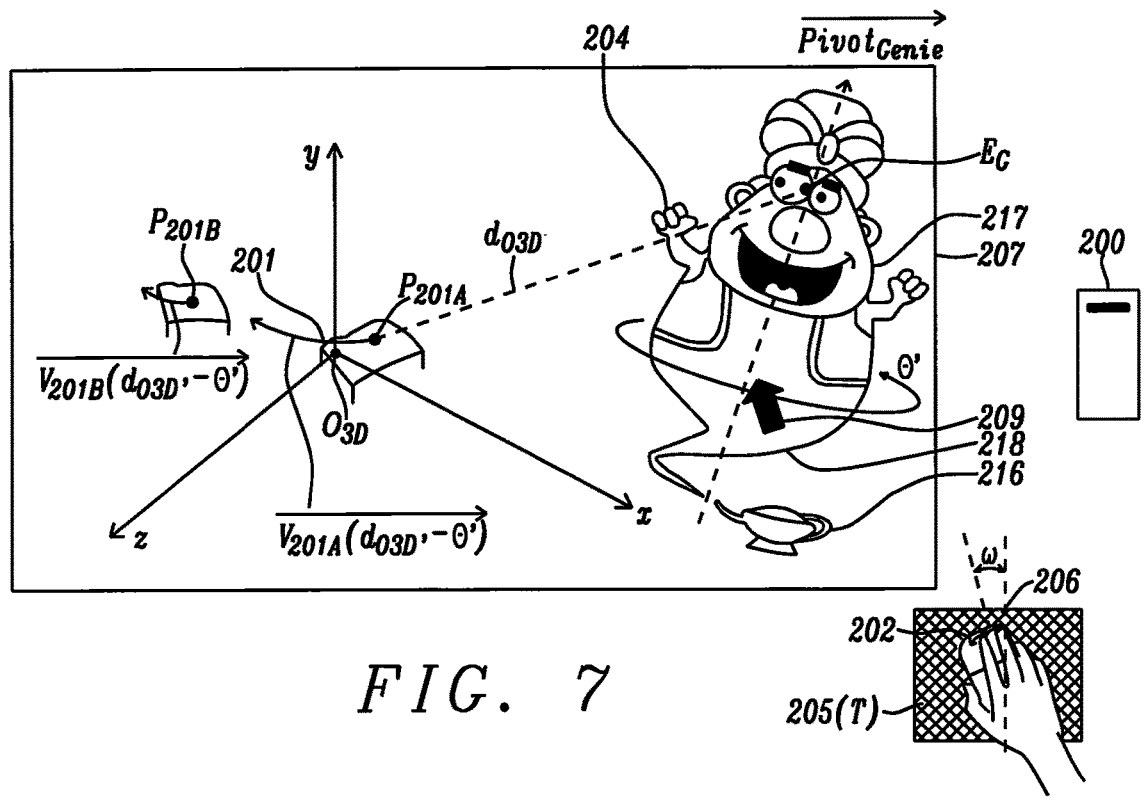
Figure 8:
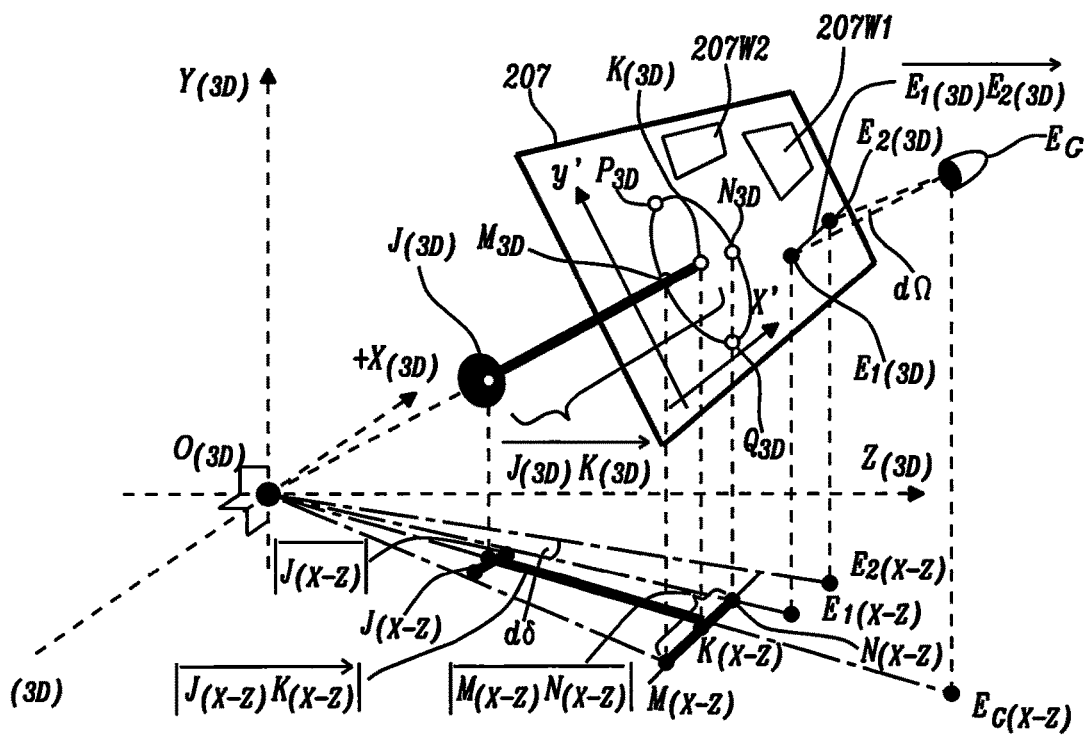
Figure 9:
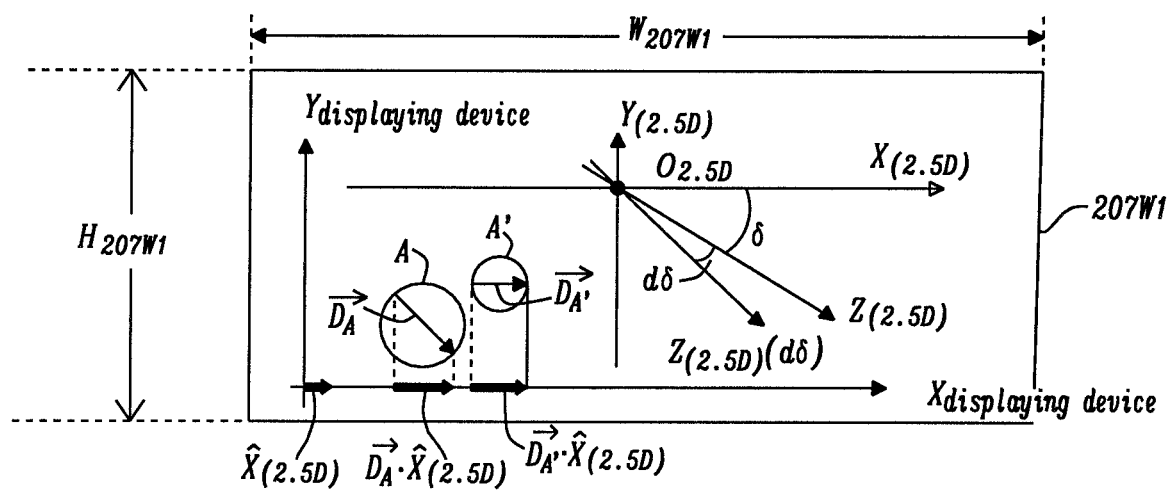
Figure 10:
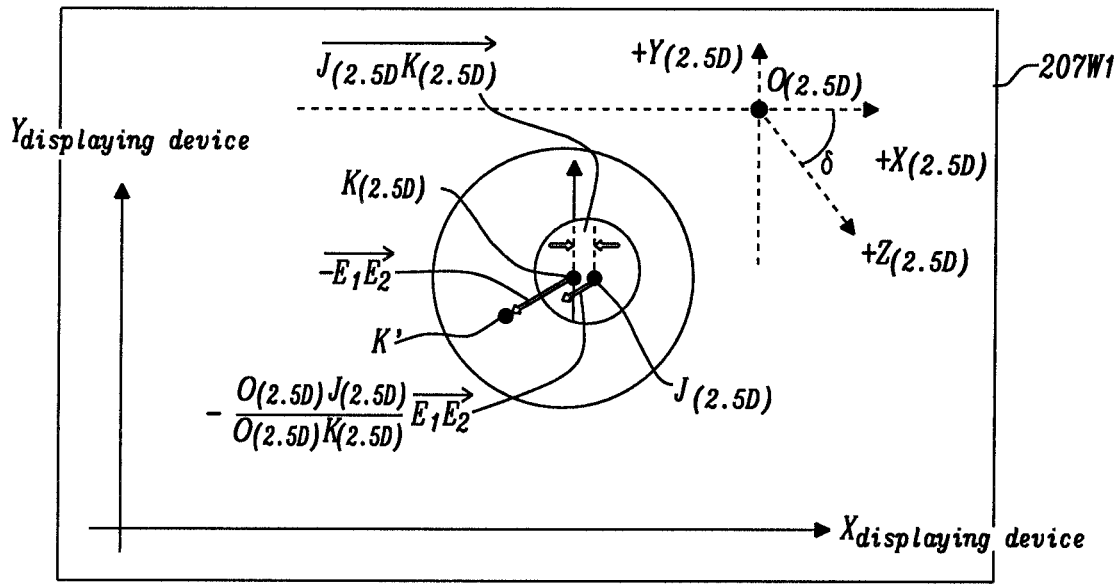
Figure 11:
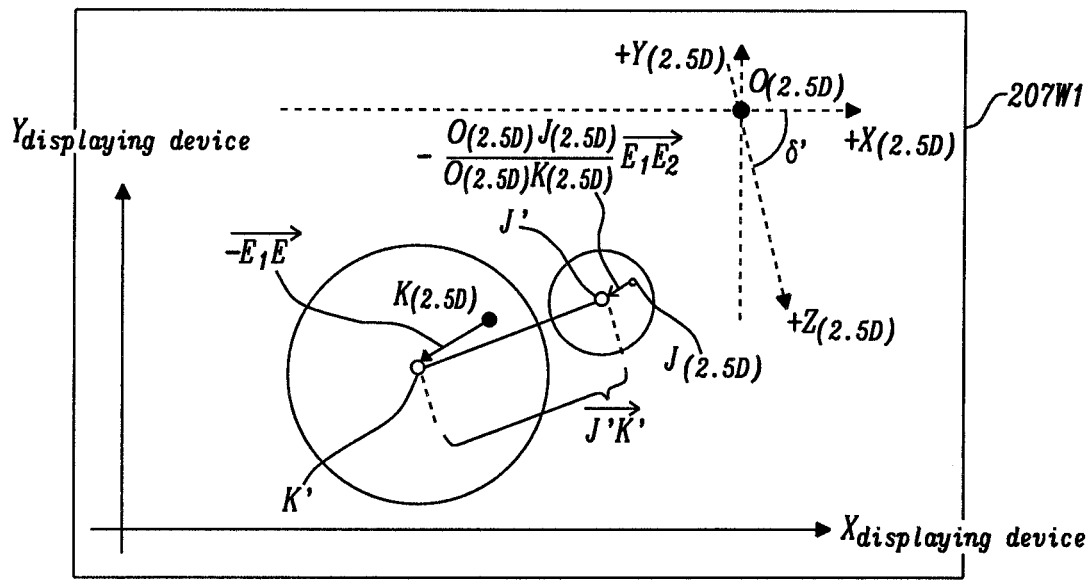

FIG. 5A schematically shows that the graphical objects in the presently disclosed 3D GUI (i.e., roses 1701L and R) are interacting with approaching object (1707) by matrix multiplying process;

FIG. 5B schematically shows that the graphical objects in the presently disclosed 3D GUI (spots and asteroids) are classified into different classes (i.e., 1701L and R) in the feature vector space, allowing for fast and accurate engagement with the approaching object (1707);

FIG. 5C schematically shows the typical processing steps taken by the presently disclosed neural network process module (610 in FIG. 4B) to adjust the accuracy and reliability of the result of neural signals (i.e., manipulating the multi-dimensional feature vectors by, e.g. convolutional process, which are implemented by steps of 1714S, Kernel functions $K_x$, which are implemented in the steps of 1715, and weighting factors, which are implemented in the steps of 1717, etc.);

FIG. 5D schematically shows that the presently disclosed 3D GUI is able to reduce the dimension of a vector graphic from 3D to 2.5D, such that the loading on the neural network module (610) is reduced effectively and efficiently;

FIG. 6 schematically shows the apparent "leeway" between two objects (i.e., circles J' and K') in a 2.5D coordinate system changes in accordance with the variation of the perspective angle δ;

FIG. 7 schematically depicts the directionality of the motion of an object in a 3D space with regard to the vanishing point when a world space camera (embodied as the Cartoon Genie) makes a relative motion with regard to the same vanishing point;

FIG. 8 schematically depicts a method of using a projected plane (i.e., $X_{(3D)}$–$Z_{(3D)}$ plane) to analyze the sweeping angle of the perspective angle of a 2.5D coordinate system, i.e., $d\delta$, when Genie's line of eye sight sweeps by an angle of $d\Omega$;

FIG. 9 schematically shows the apparent dimension of an object (i.e., circle A) in a 2.5D coordinate system changes in accordance with the variation of the perspective angle $\delta$;

FIGS. 10 and 11 schematically show that some non-linear motions of objects are manifested in a way much stronger than others when the perspective angle $\delta$ is changed;

6. DETAILED DESCRIPTION

The present disclosure describes a three-dimensional (3D) graphical user interface (3D GUI) of an electronic system, such as a computer, shown schematically in FIG. 2A as (207). This device provides the absolute address and linear and non-linear motion vectors for a 3D object, which gives its user the extraordinary experience of engaging directly with that 3D object. As an example, a cartoon "Genie" (204) is shown being made to move from a position (x; y; z) along various directions n and the genie's "flying carpet" (201) is being controlled by the Genie (as will be discussed further below) and made to move along a plane abc, in direction vectors n and n' etc. The 3D GUI described herein not only provides the means for constructing and manipulating 3D graphical constructions (i.e., a Genie or 3D scenery), which is fully described in Ser. No. 16/056,752 which is fully incorporated herein by reference, but it also provides a complete methodology by which 3D objects, with many degrees of freedom, such as robots, can be manipulated and controlled. The present disclosure will concentrate on showing how the presently disclosed 3D GUI can control a robot intelligently by application of Machine Learning (ML), a powerful tool of artificial intelligence (AI).

FIG. 4A shows a typical GUI in software layer formation, running on Hardware 620. Hardware 620 is further shown and described in FIG. 4C. As FIG. 4A shows, a GUI is a plurality of layers of software lying between the input devices (601) and the kernel (605) of an operating system (e.g. Windows, Linux, OS, Android); note that Microsoft Corp. refers to its operating system which comprises the Kernel 605 and GUI 207 as WINDOWS. In the generic definition of a GUI, a window is a region of a screen (i.e., 207 in FIG. 2A) that is allocated to a specific application; a window manager (e.g. 604) is a system software that controls the placement and appearance of windows within a windowing system in a graphical user interface (e.g. 207). The typical types of window managers comprise the stacking type, tiling type, dynamic type, or the composite type. For the detailed characteristics of a GUI, readers may refer to the Wikipedia article titled "Graphical User Interface." Note that although conventional art tends to implement the above described layers of functions as software (e.g. 602, 603, and 604, of FIG. 4A), it does not rule out the possibility that a next generation 3D GUI (207) implements certain of these layers (i.e., internal process modules of FIG. 4B, such as Support Vector Machine 616, Neural Network 610, etc.) into hardware (e.g. Application Specific IC, ASIC).

Referring now more particularly to FIG. 4C, hardware 620 (as shown in FIG. 4A) is (as referred variously herein) a computer, display system, electronic system, or electromechanical system, or more generally for purposes of this disclosure—a computing device. The computing device typically includes a central processing unit (CPU) 1402, a main memory (1404), input/output devices (1406A/B), input/output ports (1408A/B), memory I/O (1410), a bridge (1412), and a cache memory (1414) in communication with the central processing unit (1402). The central processing unit (1402) is any logic circuitry that responds to and processes instructions received from the main memory (1410), and which reads and writes data to and from memory (1410). The main memory (1410) may include one or more memory chips capable of storing data and allowing any storage location to be directly accessed by the main processor (1402).

The graphical user interface of the disclosure is typically displayed on an I/O device (1406A) such as an electronic display. Input device 601 (from FIG. 4A) similarly is represented in FIG. 4C as another I/O device (1406B), which interacts with CPU (1402).

6.1 Embedding Robot Kinematics in a 3D GUI

As robots became more and more common in our daily life, the conventional methods (e.g. algorithms and/or software) used to calculate and control the position/motion of a robot are inadequate as they have no effective way to manipulate the position or motion of a robot in a real time manner. For the applications that require in-situ monitoring and/or controlling the kinematics of a robot, the presently disclosed 3D GUI becomes a time-saving and welcome device. FIG. 3A schematically shows an exemplary "robot", e.g. a robotic arm, that can benefit from the presently disclosed 3D GUI (e.g. a six-joint PUMA® robot, hereinafter referred to as robot 700). FIG. 3B shows an alternative drawing of the end of the robot arm in FIG. 3A requiring a different matrix formulation to describe the motion of the gripper at the termination of the arm. 16/056,752 fully describes an introduction to robot kinematics as applied by the 3D GUI of this disclosure. For convenience, this section 6.1 repeats some of the introductory material presented in section 6.7 of 16/056,752, but the following material in section 6.2 of this disclosure will expand upon 16/056,752 and disclose additional capabilities of the 3D GUI.

As FIG. 3A shows, the motion of the respective joints or elbows of the robot (700) can be described by their rotational/orientation angles (i.e., $\theta_1$, $\theta_2$, $\theta_3$, $\theta_4$, $\theta_5$, and $\theta_6$). When the six joints are linked in a way as FIG. 3A depicts, the associated matrix operation of each respective joint can be expressed as:

$$^0A_1 = \begin{bmatrix} C_1 & 0 & -S_1 & 0 \\ S_1 & 0 & C_1 & 0 \\ 0 & -1 & 0 & H \\ 0 & 0 & 0 & 1 \end{bmatrix} \quad ^1A_2 = \begin{bmatrix} C_2 & -S_2 & 0 & L_{elbow1} \cdot C_2 \\ S_2 & C_2 & 0 & L_{elbow1} \cdot S_2 \\ 0 & 0 & 1 & d \\ 0 & 0 & 0 & 1 \end{bmatrix} \quad (1)$$

$$^2A_3 = \begin{bmatrix} C_3 & 0 & S_3 & a_3 \cdot C_3 \\ S_3 & 0 & -C_3 & a_3 \cdot C_3 \\ 0 & 1 & 0 & 0 \\ 0 & 0 & 0 & 1 \end{bmatrix} \quad ^3A_4 = \begin{bmatrix} C_4 & 0 & -S_4 & 0 \\ S_4 & 0 & C_4 & 0 \\ 0 & -1 & 1 & L_{elbow2} \\ 0 & 0 & 0 & 1 \end{bmatrix}$$

$$^4A_5 = \begin{bmatrix} C_5 & 0 & S_5 & 0 \\ S_5 & 0 & -C_5 & 0 \\ 0 & 1 & 0 & 0 \\ 0 & 0 & 0 & 1 \end{bmatrix} \quad ^5A_6 = \begin{bmatrix} C_6 & -S_6 & 0 & 0 \\ S_6 & C_6 & 0 & 0 \\ 0 & 0 & 1 & d_{gripper} \\ 0 & 0 & 0 & 1 \end{bmatrix}$$

Where C stands for cosine function, S stands for sine function; $L_{elbow1}$ is the length of the elbow linking joint1 and joint2; $L_{elbow2}$ is the length of the elbow linking joint3 and joint4; and the subscripts 1, 2, 3, 4, 5, and 6 in Eq. (1) denote the rotational angles $\theta_1$, $\theta_2$, $\theta_3$, $\theta_4$, $\theta_5$, and $\theta_6$, respectively.

So, when robot (700) is moving, the corresponding kinematics can be expressed by the following matrix multiplication, i.e., $$T_0^i = {}^0A_1 \cdot {}^1A_2 \cdot {}^2A_3 \cdot {}^3A_4 \ldots = \prod_{j=1}^{i} {}^{j-1}A_j = \begin{bmatrix} R_{11} & R_{12} & R_{13} & X \\ R_{21} & R_{22} & R_{23} & Y \\ R_{31} & R_{32} & R_{33} & Z \\ 0 & 0 & 0 & 1 \end{bmatrix}; \quad (2)$$

for $i = 1, 2, \ldots n$

When $i=n$, we obtain the T matrix, i.e., $T_0^n$, which provides the positional and rotational information of $P_{end}$, i.e., the end point of robot (700) with respect to the base coordinate system (i.e., O of FIG. 3A). Note that the parameters $R_{11} \sim R_{33}$, X, Y, and Z of the $T_0^i$ matrix of Eq. (2) can be directly applied to Eq. (3); this means that the presently disclosed 3D GUI can control the motion of robot (700) directly. Alternatively, said parameters $R_{11} \sim R_{33}$, X, Y, and Z of the $T_0^i$ matrix can be transformed into the other formats; a couple of the corresponding ones are shown in Eqs. (3) and (4), respectively. Readers are advised that when i is less than n, said $T_0^i$ matrix denotes the position and rotation of the internal joint, i.e., ${}^0A_1$, ${}^1A_2$, ${}^2A_3$, ${}^3A_4$, ${}^4A_5$, respectively. Special notice is further advised that using the 3D navigational device described in Ser. No. 14/294,369, the presently disclosed 3D GUI can impart physical meaning to the above stated parameters by considering said T matrix in the following formation:

$$T = \begin{bmatrix} x_n & y_n & z_n & p_n \\ 0 & 0 & 0 & 1 \end{bmatrix} = \begin{bmatrix} n & s & a & p \\ 0 & 0 & 0 & 1 \end{bmatrix} = \begin{bmatrix} n_x & s_x & a_x & p_x \\ n_y & s_y & a_y & p_y \\ n_z & s_z & a_z & p_z \\ 0 & 0 & 0 & 1 \end{bmatrix} \quad (3)$$

where n is the normal vector of the hand. If we use a parallel jaw hand, n will be orthogonal to the fingers of the robot. FIG. 3B shows the direction of $\vec{n}$.

s is the sliding vector of the hand. It is pointing to the direction of the gripper (e.g. a simplified finger) for the opening and closing movement; FIG. 3B shows the direction of $\vec{s}$.

a is the approach vector of the hand. It is pointing in the direction normal to the palm of the hand (the rotating plane denoted by $y_5$ and $z_5$ axes); FIG. 3B shows the direction of. $\vec{a}$.

p is the position vector of the hand. It points from the origin of the base coordinate system (i.e., point O of FIG. 3B) to the center of the hand coordinate system when the gripper is closed (i.e., $P_{end}$);

specifically, $\vec{n} = [n_x, n_y, n_z]$, $\vec{a} = [a_x, a_y, a_z]$, $\vec{s} = [s_x, s_y, s_z]$, $\vec{p} = [p_x, p_y, p_z]$;

$n_x = C_1[C_{23}(C_4C_5C_6 - S_4S_6) - S_1[S_4S_5C_6 + C_4S_6] = R_{11}$ $n_y = S_1[C_{23}(C_4C_5C_6 - S_4S_6) - S_{23}S_5C_6] - S_1[S_4C_5C_6 + C_4S_6] = R_{21}$ $n_z = -S_{23}[(C_4C_5C_6 - S_4S_6)] - S_{23}S_5C_6 = R_{31}$ $s_x = C_1[-C_{23}(C_4C_5C_6 - S_4S_6) + S_{23}S_5C_6] - S_1[-S_4C_5C_6 + C_4S_6] = R_{12}$ $s_y = S_1[-C_{23}(C_4C_5C_6 + S_4S_6) + S_{23}S_5C_6] + C_1[-S_4C_5C_6 + C_4S_6] = R_{22}$ $s_z = S_{23}[(C_4C_5C_6 + S_4S_6)] + S_{23}S_5C_6 = R_{32}$ $a_x = C_1[(C_{23}C_4C_5 + S_{23}C_5)] + S_1S_4S_5 = R_{13}$ $a_y = S_1[(C_{23}C_4C_5 + S_{23}C_5)] + C_1S_4S_5 = R_{23}$ $a_z = -S_{23}C_4S_5 + C_{23}C_5 = R_{33}$ $p_x = C_1[d_{gripper}(C_{23}C_4S_5 + S_{23}C_5) + S_{23}d_4 + a_3d_4 + a_3C_{23} + a_2C_2] - S_1(d_{gripper}S_4S_5 + d_2)$ $p_y = S_1[d_{gripper}(C_{23}C_4S_5 + S_{23}C_5) + S_{23}d_4 + a_3d_4 + a_3C_{23} + a_2C_2] + C_1(d_{gripper}S_4S_5 + d_2)$ $p_z = d_{gripper}(C_{23}C_5 - S_{23}C_4S_5) + C_{23}d_4 - a_3d_{23} + a_2S_2 + H$ (4)

6.2 Using Robot Kinematics in Conjunction with Machine Learning

In related disclosure, Ser. No. 16/056,752 which is fully incorporated herein by reference, we have introduced the present 3D GUI and addressed its capabilities when used in conjunction with a 3D navigational device that can provide absolute addresses. We have also described many of the capabilities of that 3D GUI as related to its ability to create and manipulate 3D scenery. Further, we have also introduced the manner in which robot kinematics can be embedded in the 3D GUI so that mechanical systems having many degrees of freedom (DOF) can be accommodated by the GUI seamlessly, transparently and pervasively. We now show that this same ability to deal with robot kinematics, when augmented by the additional capabilities of artificial intelligence such as Machine Learning, provides a user with unprecedented modes of interaction with that 3D scenery and, in addition, even provides a method for teaching the user how to interact with that 3D scenery.

This section begins by showing how a 3D GUI can use a 2.5D coordinate system (a 2D system with an additional axis of rotation) to help a user and, even more generally, a viewer, to learn how to interact with 3D scenery (i.e., a rendering created using 3D vector graphics) effectively and efficiently. By manipulating a perspective angle properly, the 3D GUI disclosed herein is able to classify a plurality of graphical vectors (i.e., the basic entities that construct 3D vector graphics) and/or motion vectors selected for denoting the levels of user engagement, into several classes. When these classes are separated by clear margins, the presently disclosed 3D GUI achieves an optimal condition in which to render key graphical features and, thereby, for engaging with the viewer most effectively. Here the differences between a graphical vector and an ordinary Euclidian vector (e.g. a motion vector) must be recalled. Graphical vectors are not the same as the mathematical Euclidian vectors. Graphical vectors are actually constructed using the Euclidian vectors, but a graphical vector is something usually hidden by the software that actually creates the graphs, e.g. the 2D and 3D vector graphics. For a detailed analysis of these distinctions, the reader may refer to: "Rex van der Spuy (2010). "Advanced Game Design with Flash", Apress. p. 306. ISBN 978-1-4302-2739-7".

To teach the presently disclosed 3D GUI and its user how to manipulate a perspective angle intelligently, there are two fundamental requirements that must be concurrently met. First, the world space camera used by the 3D GUI and described in 16/056,752 should be treated as a realistic 3D entity, so that it can be moved by the continual translational motion vectors and rotational motion vectors of six degrees of freedom, much like the robot introduced in FIG. 7A of 16/056,752 and shown here as FIG. 3. Second, the world space camera should be an "intelligent" one; that is, one that, by using a state-of-the-art machine learning theorem, can classify the graphical objects/graphical vectors selected by the 3D GUI into a plurality of classes, so that the process of classification enables the user to do computer learning with the 3D scenery effectively and efficiently.

In previously disclosed Ser. No. 16/056,752 (as noted above), the presently disclosed 3D GUI focused on the manipulation of the position or motion of a structured entity, i.e., a robot (shown here as FIG. 3), whose degrees of freedoms of all joints and elbows have been clearly defined. The present disclosure focuses on how that same 3D GUI supports an operator interacting with a 3D graphical entity whose essential features may not be as clearly defined as by a conventional 2D GUI, but which, after mapping, can be denoted by the feature vectors in a substantially higher dimensional space (e.g. one having hundreds, even thousands, of coordinates)—so high a dimension that the viewer may not be able to know the exact dimension of said feature vector space. In nature, we recognize the existence of an object by its 3D location and 3D motion vectors. To analyze the location and motion vectors of a fairly large number of objects in a 3D space, a supervised learning process can play a vital role (e.g. the "support vector machine", or SVM). On the other hand, a learning process as such can consume a large amount of the calculation power of the computer (e.g. CPU, GPU, etc.). If a GUI designer is not aware of such a situation, they may not feel the imminent demand for the industry to develop an intelligent 3D GUI such as disclosed herein to meet the upcoming challenges of pervasive 3D graphics. In the graphic rendering industry, it is very common that a 3D scenery contains many delicate details (e.g. 3D vector graphics) and the way our brains comprehend them is strongly associated with the perspective angles we take to see them.

Perspective angle is a unique feature embedded in a 2.5D graphic rendering; we human beings rely on the perspective angle to comprehend the 3D world. In this section, we will combine the merit of perspective angle and state of art learning theorem (i.e., support vector machine, SVM). With this unique combination of those two arts, a next generation 3D GUI (such as the presently disclosed 3D GUI) can demonstrate its unprecedented technological superiority to its predecessors.

When the computer industry fully enters 3D graphic regime, the soaring amount of data generated by its 3D objects creates a unique space containing a large quantity of feature vectors (which are not to be confused with the graphical vectors). Graphical vectors are those used to depict the appearance of static objects; two exemplary graphical vectors are arrows (1712) and (1713) of FIG. 5A. In the feature vector space, a motion vector is considered as representing the identity of an object that has equivalent importance to that of said graphical vector in its space.

Eq. (5) (below), is extracted from related application, Ser. No. 16/056,752, where it appears as Eq. (8). As this equation and FIG. 5A both show, the motion vector of a 3D object can be denoted by a (3×3) matrix.

$$P' = R \cdot P + T = \begin{bmatrix} X' \\ Y' \\ Z' \end{bmatrix} = \begin{bmatrix} R_{11} & R_{12} & R_{13} \\ R_{21} & R_{22} & R_{23} \\ R_{31} & R_{32} & R_{33} \end{bmatrix} \cdot \begin{bmatrix} X \\ Y \\ Z \end{bmatrix} + \begin{bmatrix} T_X \\ T_Y \\ T_Z \end{bmatrix} \quad (5)$$

Graphical vectors can also be denoted by (3×3) matrices. So, by mapping, the motion vector and graphical vector of a 3D object may, taken together, constitute a feature vector space. Note that the feature vector space may have a substantially large number of dimensions (e.g. >>6); if one uses physical connotation to depict such a situation, the dimension of the space established by said feature vectors can be so high that sometimes a viewer may not have the mental capacity to understand the "kinetics", or "kinematics", among them quickly enough. Thus, the following challenge for the 3D GUI arises: how can it present a 3D graphical image that the viewer can comprehend more effectively (e.g. at a pace that is equal to the substantially large flow of the information delivered). As one may deduce from the above, the solution has to be a mathematically sound methodology that allows the perspective angles to be adjusted intelligently. Thus, the present disclosure has to provide a method that enhances the efficiency of a viewer's learning of a 3D vector graphics by the perspective rendering techniques. To meet the above goal, the presently disclosed 3D GUI has incorporated algorithms of artificial intelligence including the Support Vector Machine (i.e., 616 of FIG. 4B), Neural Network (610), and means of perspective adjustment (i.e., 607), all in its internal process modules (615). It is thus an objective of this section to illustrate how these modules collaborate to meet the goal.

Figure 2B:
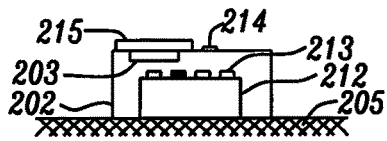
Figure 2C:
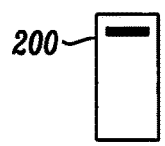
Figure 2D:
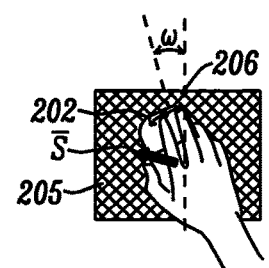

To a conventional GUI designer, changing a perspective angle manually, as by turning a rotational knob, seems not to be a difficult task (e.g. as when moving the world camera). In conventional art (e.g. a conventional video game), there have been quite a few software features that are designed for changing a scene quickly (e.g. WINDOW 1 (210) and WINDOW 2 (211) of FIG. 2A). Meanwhile, what really challenges a new generation of GUIs is how to change the perspective angle both proactively and intelligently; this has not been addressed by the conventional art. Here the reader must be advised that toggling the scenes (i.e., selecting different windows) by clicking the instructions is an artificial means—it is not a realistic viewing experience that a person has in daily life. In the real world, many dynamic situations may take place in a 3D environment, and they are equally, if not more, important than the static scenes. For example, when an internet service provider is providing a movie that is composed of many dynamic situations for a viewer, some objects may be visible to the viewer only from one perspective angle; others may be visible to said viewer from another. Hence, a realistic way of rendering a movie containing a plurality of dynamic situations is allowing a viewer to change his/her perspectives to scenery by walking close to or away from an object (which is a translational motion), or rotating his/her head to different directions (which is a rotational motion)—these are all preferably implemented by the continuous motions of a camera (contrary to hopping through a plurality of static windows) instead of merely swapping the scenes. In the conventional GUIs that claim having certain amount of 3D perspective capabilities, there is a software module entitled "world camera" (i.e., perspective camera) that is responsible for doing the job of changing perspective angles. However, conventional art lacks an effective and comprehensive means to maneuver the world camera intelligently. The rapid scene hopping caused by the conventional art often leads to a chaotic or dizzying viewing experience for the viewer. In the presently disclosed 3D GUI, the motion of the world camera is as though it is being held by a sturdy robot whose body is invisible to the viewer. Thus, the translational and rotational motions of the scene are controlled in a continual and smooth manner. This feature is achieved by the collaboration of several processing modules of the 3D GUI. Specifically, as FIG. 4B shows, inside the presently disclosed 3D GUI there are specific processing modules designed for Perspectives (607), Robotics (608), Neural Network (610), and Support Vector Machine (SVM, 616). To make the above concept more concrete to the viewer (i.e., an effective process of maneuvering the perspective angles of a scene provides an extraordinary comprehension for a dynamic situation), a unique cartoon character (i.e., Genie 204) is created by the 3D GUI, it is a 3D object without a fixed body formation, but its center of body (e.g. torso 218) can be moved by the translational and rotational motion vectors provided by the associated 3D navigational device (202) of FIG. 2D. Thus the job of generating the translational motion and rotational motion vectors for said world camera thereby can be done in a live manner.

Referring now back to FIG. 2A, a 3D cartoon character, Genie (204), is generated for such a purpose (navigating a world camera in 3D space). When a user clicks the oil lamp (216), using navigational device (202) of FIG. 2B the cartoon Genie (204) appears, thereby the user can cause the Genie (204) to change his perspective angle toward different scenes, such as the one containing the flying carpet (201), or do something else. If the operator clicks the oil lamp (216) again, the cartoon Genie (204) will disappear; consequently, the Genie's perspective angle adjusting function will be inactivated. In the 3D GUI, the provision of said cartoon Genie (204) denotes that an electronic system (200) carrying the presently disclosed 3D GUI has a unique ability to change the perspective angle intelligently and automatically. In addition to the automatic process, the presently disclosed 3D navigational device (202), may change Genie's position in a 3D space (i.e., x', y', z') by dragging the Genie (204) manually. Essentially, the entire process of manually dragging the cartoon Genie (204) is similar to that of maneuvering the flying carpet (201). What is more important to Genie (204) is that his track can be analyzed and stored by the presently disclosed 3D GUI, henceforth an intelligent maneuvering plan for Genie's perspective angle can be created by the presently disclosed 3D GUI (note that this process may require the support of some artificial intelligence functionality, which would be contained in an internal process module (610), shown schematically in FIG. 4B, which is embedded in the presently disclosed 3D GUI). The detailed steps of such an internal process module are the following. If an operator is intending to create a "script" for Genie's maneuvering plan, in the initial step, the operator may move the 3D cursor (209) to a position from which it is suitable to aim the 3D cursor (209) at Genie (204) directly, thereafter the operator may click the mouse button (215) to acknowledge the 3D GUI that Genie (204) has been designated for services. Then, by wiggling the finger (206), one may cause the normal vector of said Genie (204) to change (e.g. from $\vec{n''}$ to $\vec{n'''}$ in FIG. 2A); as we have learned from the former paragraphs, looking at FIG. 2D an operator can wiggle their finger (206) while moving the body of the presently disclosed 3D navigational device (202) over the reference surface (205). Corresponding to the combined effect of the operator's finger's motion and hand maneuvering motion over the reference surface (205), Genie's body (204) is moved in 3D manner concurrently. In Genie's eyes (its image can be displayed by a secondary 3D GUI, e.g. 207W1 of FIG. 8, which is window incorporated within the primary 3D GUI as a separate window, or, it can be presented in juxtaposition with the primary 3D GUI as a second tile widow, or, it can be presented in a swapping process with the primary window 207, etc.), the combined effect of the above stated translational and rotational movement generates an extraordinary viewing experience of scenery (e.g. Genie's perception of the location of the flying carpet 201 is constantly changing due to the maneuvering movement of the 3D navigational device 202). In the past, there has been some graphical sketching programs providing the so called world space camera as a preliminary means of changing the perspective angles; this kind of camera only provides very primitive functions as compared to those of the presently disclosed Genie (204). It is not intelligent, when having no knowledge, to try to determine where or how to look into a scene effectively. Today's computer confronts processing a vastly large amount of data provided by the internet (the computer industry often calls this phenomenon: "Big Data"), when a computer is inundated by a large amount of data, using the conventional means such as relational database analysis to sort out the information is cumbersome, and it often leads to not very useful results in the end. Providing a means for a computer to visually investigate a dynamic situation from different perspective angles thus becomes a stitch in time for such a situation (i.e., Big Data analysis). Fundamentally speaking, without the presently disclosed 3D navigational device (202), the above stated conventional world space camera cannot change the scenes (i.e., the above stated secondary 3D GUI) by manipulating the translational and rotational motions simultaneously. Hindered by such a shortcoming, prior art cannot generate a script of motion for said world space camera to move like a live Genie (204). Lacking a script to"steer" Genie (204), the conventional world space camera cannot provide any "scene plot" for a viewer to learn from the "kinetics" of a scene (note that there is a great deal of "kinetics" that affect the characters of a cartoon movie or video game; however, the state of art digital graphic industry has not exploited this characteristic effectively). For example, when watching the Disney® cartoon movie "Peter Pan", some viewers may like to follow where Peter Pan flies; others may like to follow where Tinker Bell or Wendy has gone. The presently disclosed Genie (204) is in fact a unique software module embedded in a 3D GUI that, without verbose education, provides an intuitive suggestion that the user adjust their perception to an imaginary 3D world. Still further, it takes no effort for an operator to comprehend that Genie (204) can be enlarged or shrunken (i.e., by zooming in and out of a scene), this feature fits the scenario of watching the cartoon movie Alice in the wonderland well. Still further, it takes no effort for an operator to understand that said Genie (204) can "transit" through different worlds with no difficulty, and this feature fits the theme of Disney's cartoon movie "Fantasia" quite well. Thus, a 3D GUI affiliated with the presently disclosed cartoon feature Genie (204) can help a viewer transit through various world zones without being befuddled by the drastic changes of scene. The conventional world space camera does not have such a capability in that the body of said camera is considered as a mathematical point; this makes it difficult for the operator to adjust its gesture and position easily. In an envisioned Disney movie "Fantasia® 3D", the viewer becomes a virtual Tinker Bell, immersing herself in an imaginary 3D environment, observing all the 3D objects surrounding her (e.g. flowers, etc.) from different perspective angles. In physics, the address of a static object can be denoted by its whereabouts in a three dimensional coordinate system (i.e., X, Y, and Z). As to the essential graphical entities carried by said static object, they are often denoted by the vectors derived from said address; we call the space constituted by such a vector as the graphical vector space (the object formed by these graphical vectors are called the vector graphics). If the geometrical relationship of a plurality of objects (e.g. vector graphics) is not complicated (i.e., said objects are separated by a linear margin in the formation of a wide and clear band), a viewer may comprehend said graphical vector space with no difficulty. When the relationship is quite complicated (e.g. that margin is a non-linear one), the artificial intelligence module (e.g. 610 in FIG. 4B) of the presently disclosed 3D GUI may jump into the play and map the above stated graphical vectors to another feature vector space, which has the benefit of separating said objects more clearly. One can characterize said mapping process as the following: the dimension of said feature vector space will be increased by said mapping process—it can be relatively high, and such a high dimension denotes the fundamental methodology that an artificially intelligent being such as a computer program, or a biologically intelligent being, such as a human, uses to learn about the world. In a different way of narration, the above stated mapping process can be deemed as a transition of an object through different spaces. One comes to an understanding that the dimension of the realistic world of matters (in no or slow motion) as perceived by human eyes cannot be higher than three. But the way a 3D object is interacting with the world (i.e., its motion vectors) can be denoted by a space of vectors whose dimension is far higher than three (e.g. the typical motion of a 3D object has six degrees of freedom; if said object is accelerating, then the degrees of freedom of said motion can be higher than six). With this basic understanding in mind, a high quality 3D GUI as is disclosed herein treats the static and motional objects by different means. When the presently disclosed 3D GUI is depicting a static object, using its absolute address in three dimensional format, i.e., X, Y, and Z, would meet the purpose. When the presently disclosed 3D GUI is depicting a moving object, it will be able to depict the dynamics of the motions of said object by using six, or more, degrees of freedom (i.e., each degree of freedom of said motion may constitute one dimension to said feature vector space). In the end, the dimension of the feature vector space can be far higher than six. When a 3D scenery is composed of a plurality of objects (e.g. vector graphics), the margins between these objects can be quite complicated (e.g. a non-linear band that zig-zags through said objects). The conventional (2D) GUI does not know how to deal with such a situation in that it treats all 3D objects as static points, i.e., its dimension is limited to two or three. What is worse is that when the conventional GUI treats the above stated objects as a set of mathematical points, because points themselves do NOT have any sensitivity to rotation, this makes the conventional GUI difficult to adjust the gesture of said 3D objector perspective angle easily. Using physical concepts to characterize the above stated problem of conventional GUI: the dimension of the feature vector space of a plurality of objects can be relatively high, it is so high that the conventional GUI does not have any effective means to characterize the graphical feature vectors carried therein. To solve this problem, the present high quality 3D GUI has to utilize an intelligent process to adjust the perspective angle, such that a plurality of object/motions can be classified into several classes when they are presented to the viewer by varying graphical vectors (graphical vectors are not the Euclidian vectors in the screen that are directly perceivable to human eyes, but they can be comprehended by human through visualization or imagination).

A Support Vector Machine (SVM) is a machine learning process that has been widely used in such fields as pattern recognition, forecasting, classification, and regression analysis. SVM has proven quite useful in the above applications because in many cases its performance is superior to that of the other similar prior arts, such as conventional statistical models. The detailed theory of SVM is developed by Corrina Cortes and Vladimir Vapnik; and published in: "Support Vector Network", Machine Learning, 20, 273-297 (1995).

In the general formulation of an SVM, it is defined as a maximum margin classifier (see 1711 of FIG. 5B as an example), whose decision function is a hyperplane (e.g. 1710) in a feature vector space (e.g. $X^{d(d>3)}$–$Y^{d(d>3)}$ of FIG. 5B). By the maximal values of the margin, the hyperplane divides a plurality of feature vectors into different classes (see $K_{1701L}$ and $K_{1701R}$ as the examples). Using SVM requires teaching. In the graphical vector space, a means of teaching may be given as a labeled training data set $\{x_i, y_i\}_{i=1}^n$, where $x_i \in \mathbb{R}$ and $y_i \in \{-1,+1\}$, and a nonlinear mapping $\phi(\cdot)$—which is a situation common to most of the 3D graphical rendering devices—the SVM method solves the following:

$$\min_{w,\xi,b}\left\{\frac{1}{2}\|w\|^2 + C\sum_{i}^{n}\xi_i\right\} \quad (6)$$

which is constrained to:

$$y_i\{\phi(x_i)\cdot w+b\} \geq 1-\xi_i \forall i=1\text{Ln} \quad (7)$$

$$\xi_i \geq 0 \forall i=1\text{Ln}; \quad (8)$$

The parameters w and b in Eqs. (6) and (7) denote a linear classifier in $\mathbb{R}^N$ since $x_i$ is in $\mathbb{R}^N$; $\xi_i$ is a positive valued slack variable that denotes the permitted errors of classification. We may now consider a set of learning data $(x_1, y_1), \ldots, (x_n, \ldots y_n) \in \mathcal{X} \times \mathcal{Y}$, where $x_i$ is an input taken from $\mathcal{X}$, and $y_i \in \mathcal{Y}$, which is called the output, denoting which class said input belongs to. In the present case, $x_i$ denotes the respective graphical vectors in a GUI. Per the theorem of artificial intelligence, a machine learning process is one that uses the above stated pairs of learning data to construct a model or function to predict the output, i.e., $y_{test} \in \mathcal{Y}$, of yet to come test data $x_{test} \in \mathcal{X}$. To develop a machine learning process that generalizes well, an SVM may use the so-called kernel method to exploit the structure of the data as a means to find the similarity between pairs of said learning data. When $\mathcal{X}$ denotes a space of graphical vectors that are used to construct a complicated 3D graphical entity, there may not be a notion of similarity in said X space; to cope with this problem, an intelligent GUI will map said learning data $(x_n, y_n)$ to a feature vector space $\mathcal{H}$ using a means of mapping, e.g. $\phi: \mathcal{X} \to \mathcal{H}$, $x \mapsto \phi(x)$. The similarity between the elements in $\mathcal{H}$, i.e., the feature vectors, can now be expressed using its associated dot product $<\cdot\cdot>$ $\mathcal{H}$. Henceforth, we may define a function that computes said similarity, $K: \mathcal{X} \times \mathcal{X} \to \mathbb{R}$, such that $(x \cdot x') \mapsto K(x \cdot x')$. This function K is typically called the kernel function by the industry; using the fundamental property of the "dotting" process, K satisfies:

$$K(x,x') = <\phi(x)\cdot\phi(x')> \mathcal{H}. \quad (9)$$

Thus, one understands that the mapping $\phi$ is a feature map, and thereby the space $\mathcal{H}$ is a feature vector space. In a 3D GUI, the graphical vectors of the essential features of the 3D graphical objects are converted (e.g. transform) to said feature vectors by a mapping process, the associated scheme can be selected by the GUI designer (this process usually cannot be implemented as an in-situ one; each application program may have its own mapping process. To expedite the process, a possible way is adding an ASIC, i.e., application specified IC, to an electronic system to handle this job). When a GUI classifies a plurality of feature vectors into several classes (typically using a GUI dedicated to this process), a layout of multi-class graphical entities is established in said feature vector space. This is a space that may not be directly perceivable by the viewer via a displaying device made of pixels, but it is indeed one that is understandable by the software of said GUI. For example, when a flower bouquet is composed of roses, tulips, and lilies, a high quality SVM-GUI (i.e., a GUI specifically associated with SVM) is able to sort them into different classes (e.g. class 1: roses, class 2: tulips, and class 3: lilies). When a cursor is embodied as a butterfly by the high quality SVM-GUI, the interactions between the different kinds of flowers and the butterfly (i.e., cursor) can be different. Fundamentally speaking, such a unique capability of the presently disclosed GUI (207) is attributed to its capability of recognizing different classes of said feature vectors, and thereby the presently disclosed GUI (207) can support an operator, i.e., the butterfly, enabling it to navigate through said bouquet in an interactive manner.

In a relatively simple situation, such a plurality of flowers may have clear margins in the graphical vector space so that the above stated classification does not have to be elevated to the feature vector space. Using a linear algorithm, an SVM can do a decent job of separating the flowers directly. When said margin is not linear in the graphical vector space, using the kernel method to exploit the above attribute (i.e., linear classification) in a higher dimensional space, i.e., the feature vectors space, and thereafter constructing a linear algorithm therein, may result in the non-linear algorithm addressing a complicated (i.e., non-linear margin) situation in the graphical vector space successfully. From mathematical point of view, the above stated kernel method relies on the notion of the similarity among said feature vectors. We will find out how they are associated with vector dotting process in the following.

Let us consider a set of teaching data $(x_1, y_1), \ldots, (x_n, y_n) \in \mathcal{X} \times \mathcal{Y}$, wherein $x_i$ are the inputs taken from $\mathcal{X}$ and $y_i \in \mathcal{Y}$ are called the outputs (i.e., the classification). In the field of artificial intelligence, a machine learning process denotes a unique methodology that uses the above stated teaching data pairs to construct a model or function to predict on the test examples x EX, which is unseen at the moment of learning, but is expected to come afterwards. To construct a machine learning process that generalizes this theorem, a kernel method (i.e., a module of software that contains a kernel function) can be used to exploit the structure of said learning data, and thus defines a similarity between said pairs of teaching data. In the following, we are demonstrating the vital role of vector dotting process plays in said kernel function.

A real symmetric n×n matrix K whose elements are $K(x_i, x_j)$ is called positive definite if for all $c_1, \ldots, c_n \in \mathbb{R}$, $$\sum_{i,j=1}^{n} c_i c_j K \geq 0 \qquad (10)$$

With this attribute kept in mind, a GUI design engineer understands that algorithms that are operating on the data in terms of dot products can be used by any positive definite kernel function by simply replacing the dot product formulation $<\phi(x)\cdot\phi(x')> \mathcal{H}$ with kernel evaluations K(x·x'); this is a technique called by the industry "the kernel trick" (NOT to be confused with the kernel of the operating system 605 in FIG. 4A, e.g. Linux, XNU, etc.). If a GUI design engineer uses some algebra on said kernel functions, he/she may find out that said SVM kernel functions are very useful in terms of teaching a GUI how to present a complicated graph efficiently. We can demonstrate this in the following. Let $K_1$ and $K_2$ be the two positive definite kernels on $\mathcal{X} \times \mathcal{X}$, A be a symmetric positive semi-definite matrix, $d(x_i \cdot x_j)$ be the result of a dotting process, which is a proper distance, $f$ be any function with support in $\mathcal{X}$, and μ>0. Then, the following functions are also kernel functions:

$$K(x\cdot x')=K_1(x\cdot x')+K_2(x\cdot x') \qquad (11)$$

$$K(x\cdot x')=\mu K_1(x\cdot x') \qquad (12)$$

$$K(x\cdot x')=K_1(x\cdot x')\times K_2(x\cdot x') \qquad (13)$$

$$K(x\cdot x')=x^T A x' \qquad (14)$$

$$K(x\cdot x')=K_1(f(x)\cdot f(x')) \qquad (15)$$

The above basic properties of kernel functions help a GUI designer develop certain measures to refine the similarity among the feature vectors, making them better fitted to the fundamental characteristics of a graphical entity. For example, a GUI designer can sum the dedicated kernel functions to different portions of the feature vector space using Eq. (15). In addition, a scaling factor can be added to a kernel function, such as Eq. (15). Thus, one comes to an understanding that vector dotting process indeed plays the central role for an SVM to analyze the graphical objects. Note that prior art (e.g. Vapnik's publication) only exploits the said dotting process by algebraic means (e.g. Eqs. 11~15). To further enhance its utility, the presently disclosed 3D GUI conducts said dotting process by manipulating the perspective angle in the GUI (e.g. FIG. 6). Compared to prior art, performing said dotting process in geometrical domain, i.e., the way the presently disclosed 3D GUI does, provides a more intuitive and more powerful means for an 3D GUI to render a 3D scenery (e.g. one that is constructed using 3D vector graphics); the operator thus can learn and interact with said 3D vector graphics more effectively and efficiently.

Generally speaking, the cartoon feature Genie (204) is watching the scene that is directly in front of him; rear view or side view are not so necessary in ordinary situations. In this situation, Genie's head does not have to turn, and the above stated translational and rotational motion vectors generated by the presently disclosed 3D navigational device (202) have provided sufficient degrees of freedom (i.e., six) for an operator to maneuver Genie's body (204) anywhere in a 3D space. If an operator desires to turn Genie's head (217) while moving his body (204) by said translational and rotational motion vectors, then Genie's head (217) gains an extra capability of seeing the side or rear view. This feature is helpful; but it has a price to pay for, i.e., Genie (204) needs one more degree of freedom (this motion can be deemed as the seventh DOF). In the present 3D GUI such an additional degree of freedom is provided by the parameter 9 of FIG. 7 (in fact, it is generated by the parameter w of the presently disclosed 3D navigational device). Here we enter the discussion on the perspective angle analysis by two steps. In the first step, we focus on the fundamental utilities of the perspective angle. In the second, we extend the above stated feature to various applications. For example, the above stated extra degree of freedom, i.e., the parameter ET, can be used by a video game player to guide the cartoon character Peter Pan swinging the dagger while flying in the 3D space. Without such a parameter 9, prior art does not have any effective means to manipulate the motions of Peter Pan's torso and hand in a separated manner.

Referring again now to FIG. 7, when an operator aims the 3D cursor (209) at Genie (204) and clicks the mouse button to call for Genie's services, the subsequent action of rotating (i.e., spinning) the body of the presently disclosed 3D navigation device (202) over the reference surface (205 or 205T) by an angle ω will lead to a corresponding spinning motion on Genie's head (217) or torso (218) by an angle 9' (the remaining portions of Genie's body may also be spun, but this is not in the scope of the present 3D GUI). When Genie's head (217) is turning towards a specific direction, the objects (P201A) and (P201B) in Genie's eyes will be making the corresponding motions in the opposite direction. As the exemplary case of FIG. 11 shows, when Genie's head (217) is turning in a direction that is the counterclockwise with respect to the pivot axis $\overrightarrow{Pivot_{Genre}}$, the motions of said objects (P201A) and (P201B) as perceived by Genie (204) will be in the direction (i.e., $-\theta$) that is opposite (i.e., clockwise, $-\theta'$) to said turning direction of Genie's head (i.e., $\theta'$). Determining the magnitude of said motion of these objects requires one to assign a vanishing point in the 3D space first. In the case of FIG. 11, said vanishing point has been assigned to the origin of the 3D coordinate system x-y-z, i.e., $O_{3D}$. Note that what FIG. 7 shows is merely a contextual illustration, the rule of scale may not be applied to the respective objects in FIG. 7 in realistic manner (e.g. Genie may be quite further away from said vanishing point $O_{3D}$ as the way FIG. 7 has presented). Nevertheless, the geometrical relationship among said objects still holds well in FIGS. 11 through 16, and, most importantly, such a relationship complies with the fundamental rules of perspective sketching.

In the art of perspective sketching, a vanishing point is one that is departed from the viewer (in this case, it is the Genie 204) by a significant amount of distance such that two objects located nearby to the vanishing point are perceived by the viewer as having converged to one spot, i.e., there is no longer a distinctive differentiation between the two objects. As FIG. 7 shows, such a distance is denoted as $d_{O3D}$. As FIG. 7 also shows, the translational motion vectors of said objects (P201A) and (P201B) as perceived by the viewer (Genie 204) are $V_{201A}$ ($d_{O3D}$,$-\theta'$) and $V_{201B}$ ($d_{O3D}$,$-\theta'$), respectively. The parameters in the parenthesis suggest that said motion vectors (i.e., $V_{201A}$ and $V_{201B}$) are the functions of the relative distance between said vanishing point $O_{3D}$ and said objects, which is largely equal to $d_{O3D}$. In addition, the function is affected by the turning motion of Genie's head, which is 9.

FIG. 8 shows an exemplary case of how an intelligent perspective angle adjusting process takes place in the presently disclosed 3D GUI. Referring now to FIG. 8, two objects in circular shapes are presented by the presently disclosed 3D GUI (207), i.e., $J_{(3D)}$ and $K_{(3D)}$, respectively. Between the two circles, there is a line linking their centroids, i.e., $\overline{J_{(3D)}K_{(3D)}}$. Before the spinning action of Genie's head (217) takes place, the geographical centers of Genie's two eyes, $E_G$ herein, is generally aligned with the centroids $J_{(3D)}$ and $K_{(3D)}$; thus, from where $E_G$ is, the two circles $J_{(3D)}$ and $K_{(3D)}$ appear to be overlapping with one another. As FIG. 8 also shows, the diameter of circle $K_{(3D)}$ is substantially larger than that of circle $J_{(3D)}$; hence, Genie (204) is not able to acknowledge the existence of the circle $J_{(3D)}$ by his own observation. The same situation happens on the line $\overline{J_{(3D)}K_{(3D)}}$; specifically, from the standpoint of $E_G$, line $\overline{J_{(3D)}K_{(3D)}}$ looks like nothing but a dot/point to Genie (204). Imagine said circle $J_{(3D)}$ and said line $\overline{J_{(3D)}K_{(3D)}}$ are a unique atom and bond in a large molecule which contains a myriad of atoms and bonds (e.g. a spiral of DNA); if an operator is intending to investigate certain properties of said atom $J_{(3D)}$ or said bond $\overline{J_{(3D)}K_{(3D)}}$, the conventional GUI is virtually useless in that it does not have any clue as to how to present them in a proper manner. To enable the viewer to observe a particular object that lies within a myriad of objects, an automatic and intelligent perspective angle-adjusting feature would play a vital role in a high quality 3D GUI (e.g. 207). For example, as FIG. 8 shows, in order to reveal the circular shape of circle $J_{(3D)}$, and the length of $\overline{J_{(3D)}K_{(3D)}}$, the Genie (204) has to move his torso (218) laterally (i.e., along the direction of x axis) and turn his head (217) by an angle $\theta'$, such that the objects presented in the presently disclosed 3D GUI (207), i.e., circles $J_{(3D)}$ and $K_{(3D)}$, as perceived by Genie (204) from the new location are separated from one another by a discernable distance. We now denote two points, i.e., $E_{1(3D)}$ and $E_{2(3D)}$, on the presently disclosed 3D GUI (207) as the ones that engage the direct contact with the line of sight of $E_G$ before and after Genie (204) turns his head (217). As FIG. 7 shows, before Genie (204) turns his head (217), his line of sight is intersecting with the presently disclosed 3D GUI (207) at the point $E_{1(3D)}$. After Genie (204) has turned his head (217) by an angle $d\Omega$, his line of sight intersects with the presently disclosed 3D GUI (207) at a new point, i.e., $E_{2(3D)}$. Corresponding to the sweeping movement of Genie's line of sight, which is denoted as $\overrightarrow{E_{1(3D)}E_{2(3D)}}$ by the presently disclosed 3D GUI (207), the objects presented therein, i.e., circles $J_{(3D)}$ and $K_{(3D)}$, and line $\overline{J_{(3D)}K_{(3D)}}$, are subjected to their respective relative motion vectors with regard to the terminal point of line of eye sight $E_G$; in this situation, as has been explained in the above, the magnitude of said relative motion vector is a function of the relative distance between said objects and said vanishing point $O_{3D}$. Here the reader is reminded that the presently disclosed 3D GUI (207) is in effect a plurality of layers of software modules that are designed to handle 3D positional/motional data. In other words, the 3D GUI is able to process 3D positional/motional data in the format of, say, x, y, and z; a conventional GUI is a 2D software-using device, it can only handle 2D positional data, i.e., x and y. When it comes to presenting 3D positional data by the 3D GUI (207) onto a displaying device whose physical display format is 2D (e.g. a flat Liquid Crystal Displaying Panel), a process of converting the 3D positional data to a 2.5D format in accord with the fundamental rules of perspective sketching is required (e.g. certain modules in the 3D GUI 207, such as the Display Server 603, etc., may be responsible for performing that task). As FIG. 13 shows, an $X_{(2.5D)}$-$Y_{(2.5D)}$-$Z_{(2.5D)}$ coordinate system is embodied in the window (207W1), which is in effect an element of usable area on the displaying device allocated to it by the 3D GUI (207). There are some general geometrical relationships between the 3D coordinate system of a realistic world and the 2.5D coordinate system $X_{(2.5D)}$-$Y_{(2.5D)}$-$Z_{(2.5D)}$. As a rule of thumb, the $X_{(2.5D)}$ axis and $Y_{(2.5D)}$ axis of window (207W1) correspond to the $X_{(3D)}$ and $Y_{(3D)}$ axes of the realistic world. As to the third axis of said 2.5D coordinate system, i.e., $Z_{(2.5D)}$, it is drawn as a slanted line on the geographical plane of $X_{(2.5D)}$–$Y_{(2.5D)}$, intersecting with said two axes at the origin $O_{(2.5D)}$, which in some situations is also defined by the present 3D GUI as the vanishing point of the perspective sketch (i.e., 207W1). As FIG. 8 shows, the angle of intersection between said $Z_{(2.5D)}$ axis and said $X_{(2.5D)}$ axis is denoted as δ. When the value of δ changes, we denote the process as one associated with perspective angle changing. In the following, we will elaborate how an object in a 2.5D coordinate system changes its physical location and size in a displaying device (i.e., $X_{displaying\ device}$, $Y_{displaying\ device}$) when the angle of intersection δ is changed. To reiterate, a conventional GUI does not know all this because size and directionality do not apply to its basic graphical element, i.e., pixel or voxel. The presently disclosed 3D GUI (207) considers said pixel and voxel as physical object, thereby size and directionality matter to the basic graphical element of a perspective sketch.

As FIG. 7 shows, the size of an object displayed in a 2.5D coordinate system is inversely proportional to its relative distance to the viewer (i.e., the viewer's eye, $E_G$). Or, said in a different way, the size of an object in a 2.5D coordinate system is proportional to its relative distance to said vanishing point, i.e., $O_{2.5D}$. In practice, when a GUI design engineer is investigating the size of an object in a 2.5D coordinate system, an easy and effective way to do the job is look into the geometrical relationship between said object and said 2.5D vanishing point, $O_{2.5D}$. FIGS. 7 and 9 depict how such a geometrical relationship is established.

Referring now to FIG. 7, when a person projects several objects in a 3D coordinate system (i.e., the $X_{(3D)}$–$Y_{(3D)}$–$Z_{(3D)}$ coordinate system) onto its $X_{(3D)}$–$Z_{(3D)}$ plane, the above stated geometrical relationship can be revealed more clearly to the viewer. On said $X_{(3D)}$–$Z_{(3D)}$ plane, the projected length of the line linking points $M_{(3D)}$ and $N_{(3D)}$ is $|\overline{M_{(x-z)}N_{(x-z)}}|$. The length of this projected line by and large tells us how large said circle $K_{(3D)}$ may be. The other circle $J_{(3D)}$ is located relatively closer to the vanishing point $O_{(3D)}$ (i.e., the origin point of the $X_{(3D)}$–$Y_{(3D)}$–$Z_{(3D)}$ coordinate system) as compared to the location of circle $K_{(3D)}$. When one looks into said $X_{(3D)}$–$Z_{(3D)}$ plane, the projected diameter of said circle $J_{(3D)}$ is $|\overline{J_{(x-z)}}|$; by appearance, said projected diameter is substantially shorter than line $\overline{M_{(x-z)}N_{(x-z)}}$ is. Thus, we can understand that there are two fundamental reasons that cause said circle $J_{(3D)}$ to appear smaller than $K_{(3D)}$ in the eyes of Genie (204). First, the physical dimension of circle $J_{(3D)}$ and $K_{(3D)}$, and, second, their relative distances to the origin of the $X_{(3D)}$–$Y_{(3D)}$–$Z_{(3D)}$ coordinate system, i.e., $O_{3D}$. In this case, both causes lead to a common consequence: circle $K_{(3D)}$ blocks Genie's line of sight (i.e., occlusion), preventing him from seeing the circle $J_{(3D)}$. The remedy for this problem is to move Genie's line of sight away from the point $E_{1(3D)}$. FIG. 8 shows a 2.5D coordinate system (i.e., $X_{(2.5D)}$–$Y_{(2.5D)}$–$Z_{(2.5D)}$ used by a window 207W1, which is a segment of the presently disclosed 3D GUI). Here we are using a secondary window (207W1) to depict such a 2.5D coordinate system; as a matter of fact, the same rule (i.e., depicting a 3D scene by 2.5D coordinate system) can be applied to the other window (e.g. 207W2 of FIG. 12), or even the entire 3D GUI. Referring again to FIG. 13, within said window (207W1), a coordinate system $X_{displaying\ device}$–$Y_{displaying\ device}$ is used to denote the geographical address of the objects lying therein. Mathematically, the 2.5D coordinate system and the geographical address of the objects in the presently disclosed 3D GUI satisfy the following equation:

$$X_{displaying\ device} = X_{(2.5D)} + Z_{(2.5D)} \cdot \cos\delta \quad (16)$$

$$Y_{displaying\ device} = Y_{(2.5D)} - Z_{(2.5D)} \cdot \sin\delta \quad (17)$$

where the symbol "·" denotes multiplying; δ is the intersecting angle between said $X_{(2.5D)}$ and $Z_{(2.5D)}$ axes; $X_{displaying\ device}$ and $Y_{displaying\ device}$ denote the physical address of the object lying in the displaying device (i.e., 217); the parameters $X_{(2.5D)}$, $Y_{(2.5D)}$, and $Z_{(2.5D)}$ are the coordinate values of said object in said 2.5D window (207W1).

As FIGS. 7 and 8 show, when Genie (204) is turning his head (217) by an angle dΩ, the above stated intersecting angle δ (i.e., $\angle E_{1(X-Z)}O_{(3D)}E_{2(X-Z)}$) is changed by an amount of dδ. For the simplicity of analysis, we let all objects in the 3D space not having any relative motions with respect to Genie (204); this makes the coordinate values of said objects in said 3D coordinate system (i.e., $X_{(3D)}$, $Y_{(3D)}$ and $Z_{(3D)}$ of FIG. 7) unchanged while Genie (204) is turning his head (217); in the meantime, the point that the presently disclosed 3D GUI (207) engages the direct contact with the line of sight of $E_G$ is going to be moved from $E_{1(3D)}$ to $E_{2(3D)}$ when Genie (204) is turning his head (217) by said angle dn. In Genie's eyes, said turning action of head (217) will lead the rotational movement of the $Z_{(2.5D)}$ axis of said 2.5D coordinate system (i.e., 207W1). As the consequence, such a rotational movement of said $Z_{(2.5D)}$ axis with respect to said $Y_{(2.5D)}$ axis will lead to the apparent translational motion of all objects in said 2.5D coordinate system. To depict the above phenomenon clearly, the following equations are the differentiations of Eqs. (16) and (17):

$$dX_{displaying\ device} = dX_{(2.5D)} + dZ_{(2.5D)} \cdot \cos(\delta) - Z_{(2.5D)} \cdot \sin(\delta) d\delta \quad (18)$$

$$dY_{displaying\ device} = dY_{(2.5D)} - dZ_{(2.5D)} \cdot \sin(\delta) - Z_{(2.5D)} \cdot \cos(\delta) d\delta \quad (19)$$

where the parameter dδ denotes the change of the angle intersected by the $X_{(2.5D)}$ and $Z_{(2.5D)}$ axes of FIG. 9; $dX_{displaying\ device}$ and $dY_{displaying\ device}$ denote the changes of the address values of an object in the displaying device of FIG. 9 (i.e., 207W1).

A GUI design enginer can now adjust the apparent locations of the objects in the displaying device. For example, when an object is unmoved in the 3D space (i.e., $dX_{(2.5D)}=0$, $dY_{(2.5D)}=0$, and $dZ_{(2.5D)}=0$), but there is a validated value of dδ (i.e., dδ≠0), as EQ's. (18) and (19) reveal, the above situation will lead to the validated values of $dX_{displaying\ device}$ and $dY_{displaying\ device}$ ($dX_{displaying\ device}$≠0, and $dY_{displaying\ device}$≠0), which means that the object is going to perform an apparent translational motion in window (207W1). Alternatively, when an object is moving by itself during the period of said dδ, or, said another way, Genie (204) then observes a relative motion with respect to said realistic object (denoted by the relocation of $E_G$ of FIG. 6), henceforth the parameters $dX_{(2.5D)}$, $dY_{(2.5D)}$, and $dZ_{(2.5D)}$ of Eqs. (18) and (19) will have non-zero values, which subsequently leads to the variations of the 2.5D coordinate values of said realistic object in the displaying device of FIG. 6; in latter paragraphs, we will use FIG. 9 to explain such a situation more clearly.

In order to analyze how the intersecting angle dg is generated in a lucid manner, one may look into the $X_{(3D)}$–$Y_{(3D)}$ plane of the 3D coordinate system of FIG. 8 (i.e., $X_{(3D)}$–$Y_{(3D)}$–$Z_{(3D)}$. As FIG. 8 shows, there are two lines that are intersecting with one another on the vanishing point $O_{(3D)}$, i.e., $\overrightarrow{O_{(3D)}E_{1(X-Z)}}$ and $\overrightarrow{O_{(3D)}E_{2(X-Z)}}$ respectively; note, the two terminal points of said two lines, i.e., $E_{1(X-Z)}$ and $E_{2(X-Z)}$, reveal that dg is generated by the sweeping action of Genie's line of eye sight. When Genie's line of eye sight is sweeping from $\overrightarrow{E_G E_{1(3D)}}$ to $\overrightarrow{E_G E_{2(3D)}}$, an angle $\angle E_{1(3D)} O_{(3D)} E_{2(3D)}$ is formed in the 3D space; this angle is too small to be presented by said $X_{(3D)}$-$Y_{(3D)}$-$Z_{(3D)}$ coordinate system clearly, so we may turn to look into its projected image on the $X_{(3D)}$-$Z_{(3D)}$ plane, i.e., $\angle E_{1(X-Z)} O_{(3D)} E2_{(X-Z)}$, which reveals its shape as well as motion more clearly. We now denote $\angle E_{1(X-Z)} O_{(3D)} E_{2(X-Z)}$ as dδ, it is in effect the rotational (sweeping) angle of the $Z_{(2.5D)}$ axis of FIG. 8, which is now clear that it is caused by the spinning action of Genie's head (217) by said angle dΩ. Take this effect to FIG. 9, when the $Z_{(2.5D)}$ axis of the 2.5D coordinate system of FIG. 9 is moving, all objects in said 2.5D coordinate system will be moving accordingly. Correlate this effect to FIG. 7, when the motion of said $Z_{(2.5D)}$ axis is caused by the spinning action of Genie's head, the entire process of rotating said $Z_{(2.5D)}$ axis with regard to the the pivot axis $\overrightarrow{Pivot_{Genie}}$ will make all objects in said window (207W1) moving in the direction opposite to the spinning motion of said Genie's head (217). With that basic understanding in mind, we now can move on to analyze the motions of the objects that have specific volumes or dimensions.

As FIG. 9 shows, when the 3D GUI uses a 2.5D perspective sketching methodology to depict an object in a scene, by the fundamental rule of 2.5D sketching, said object will have different apparent sizes (i.e., area of A≠A') when its relative distance to the vanishing point $O_{(2.5D)}$ changes. FIG. 6 shows how a viewer's capability of differentiating the objects in a 2.5D coordinate system is affected by the perspective angle (e.g. $\delta_1$). As FIG. 6 shows, in order to change the perspective angle toward an object in a 2.5D sketch, there are two ways to do so:

(1) Relocate Genie (204) from one place to another in the 3D space (e.g. move from $E_{G1}$ ($\delta_1$) to $E_{G2}$ ($\delta_2$);
(2) Turn Genie's head (217) by an angle dii, such that said perspective angle $\delta_1$ is changed by an angle dδ.

The above two methods can be implemented concurrently, and they can be done manually or automatically. When a GUI is adjusting said perspective angle manually, the above two methods can be implemented by an operator using the presently disclosed navigation device (202); when a computer (200 of FIG. 2C) is intended to adjust said perspective angles automatically, it mainly relies on some algorithms that are developed based on Eqs. (30) and (31) to achieve the goal.

Referring now to FIG. 9, a 2.5D coordinate system is formed by three axes, i.e, $X_{(2.5D)}$, $Y_{(2.5D)}$, and $Z_{(2.5D,\ EG1)}$. In order to generate the perspective sketching viewing experience to a viewer, a unique angle of intersection between said $X_{(2.5D)}$ axis and $Z_{(2.5D,\ EG1)}$ axis is applied to FIG. 6, i.e., $\delta_1$. Namely, this angle $\delta_1$ denotes the perspective angle of said perspective sketching; at the perspective angle $\delta_1$ (e.g. $\delta_1$~45°), the direct viewing point of Genie (204) is located at $E_{G1}$ ($\delta_1$). Within said perspective sketch (i.e., 207W1), two circles, i.e., $J_{(2.5D)}$ and $K_{(2.5D)}$, are placed next to each other; their apparent dimensions as shown by the displaying panel (207W1$_{Displaying\ device}$) are denoted as |$J_{(2.5D)}$| and |$K_{(2.5D)}$|, respectively. As FIG. 10 further reveals, at the moment said perspective angle $\delta_1$ is about 45°, |$J_{(2.5D)}$| and |$K_{(2.5D)}$| appear as if they are linking one another; the viewer will have difficulty to tell if said circles $J_{(2.5D)}$ and $K_{(2.5D)}$ are one object or two objects. When Genie (204) is intended to move his body to different locations (e.g. from $E_{G2}$ to $E_{Gx}$) to seek for a better vision on said circles, he will have a range of perspective angles (i.e., $\delta_1$ is varying) that allows him to tell if said two circles are one or two objects (e.g. between $\delta_2$ and $\delta_x$). Upon taking the initial step of making the body movement, as FIGS. 6 and 7 show, Genie (204) has two choices, i.e, making said perspective angle $\delta_1$ vary by moving $E_{G1}$, or making said perspective angle $\delta_1$ smaller by moving Genie's body to the left (the direction right or left are arbitrarily chosen by the present 3D GUI for easy narration; the realistic direction would have to be determined by the relative positions between $O_{(2.5D)}$ and $E_{G1}$ in the 3D space). Glancing at the scene by turning the head (217) helps Genie (204) decide which direction he shall move his body to judiciously. Referring to FIG. 10 again, when Genie's line of sight is changed from $\overrightarrow{E_G E_1}$ to $\overrightarrow{E_G E_2}$, a sweeping angle of Genie's line of sight is formed, i.e., da Corresponding to said sweeping action of Genie's line of sight, a rotational angle dδ of the $Z_{(2.5D)}$ axis of the $X_{(2.5D)}$-$Y_{(2.5D)}$-$Z_{(2.5D)}$ coordinate system of FIG. 10 shall take place. Per that rotational movement, circles $J_{(2.5D)}$ and $K_{(2.5D)}$ are moved to new locations, which become J' and K' eventually. Note carefully, at the new perspective angle (i.e., $\delta_1$+dδ), the apparent dimensions of said two circles, i.e., |J'| and |K'|, are not affecting one another; the evidence is there is a leeway DJ'K' between said two circles (|$J_{(2.5D)}$| and |$K_{(2.5D)}$| don't have any leeway like this). Thus, one comes to an understanding that sweeping the perspective angle $\delta_1$ by a small angle dδ can provide a leading index for an intelligent 3D GUI to generate an intelligent motion plan of the world camera (i.e., Genie 204), which has the merit of revealling the shape or dimensions of the 3D objects presented therein effectively and efficiently (i.e., similar to the future proof techniques). In practice, said change of the rotational angle dδ of the $Z_{(2.5D)}$ axis is dependent upon several parameters of the presently disclosed 3D GUI. Referring now to FIG. 10 again, when the viewing distance (i.e., VD) between the terminal point of the line of sight, e.g. $E_{Gx}$, and the displaying device (207W1$_{Displaying\ device}$) is substantially larger (e.g. several tens of meters) than the length of $|\overrightarrow{E_1 E_2}|$, which is the distance between the two points on said the displaying panel (e.g. mm) that engage direct contact with said line of sight of $E_G$ before and after Genie (204) turns his head (217), the sweeping angle of Genie's line of sight dΩ can be calculated as:

$$d\Omega = \frac{|\overrightarrow{E_1 E_2}|}{VD} \tag{20}$$

Corresponding to the above stated sweeping action of Genie's line of sight by angle dΩ, the perspective angle $\delta_1$ shall be changed by an amount of dδ, whose value can be calculated by:

$$d\delta = \frac{|\overrightarrow{E_1 E_2}|}{DOS} = \frac{|E_1 E_2|}{\overline{X_{(2.5D)}Z_{(2.5D,90°)}}} \tag{21}$$

where DOS denotes the depth of scene of window (207W1), whose value is $|\overrightarrow{X_{(2.5D)}Z_{(2.5D,90°)}}|$. For example, a typical value of said DOS is several kilometers (km). Here the readers may also be acknowledged that one of the main differences between FIGS. 10 and 11 is the incorporation of DOS. What FIG. 11 shows is the outlook of the presently disclosed 3D GUI (207); what FIG. 10 shows is the geographical relationship and certain scalar parameters used by the presently disclosed 3D GUI (207).

In FIG. 6, a path of Genie's movement (i.e, $\overrightarrow{Path_{EG}}$) is generated for providing a unique viewing experience for the viewer of the displaying device (207W1$_{Displaying\ device}$). In practice, path $\overrightarrow{Path_{EG}}$ can be generated manually or automatically; the winding profile of path $\overrightarrow{Path_{EG}}$ denotes the presently disclosed 3D GUI (207) is able to reveal 3D objects/motion in a proactive, intelligent manner. When the computer industry enters 3D graphic regime, this kind of phenomenon (i.e., one object blocks the image of the other) is literally inevitable to all situations. Hence, an intelligent 3D GUI must include the ability to help the viewer differentiate the objects in a 2.5D perspective sketch more easily.

The situation depicted in FIG. 6 is a relatively simple one—there are only two objects in the window (207W1). In practical situations, a complicated scene may be composed of a myriad of objects (e.g. a Big Data set), each of which may have a unique motion vector of its own. In this situation, the collaborative functionality of Neural Network (610) and Support Vector Machine (616) of FIG. 4B come into play. In a neural network system, a computer does not seek a surefire answer that is derived only based on a human being's knowledge (e.g. the use of linear algebra). Instead, the Neural Network (610) will perform a supervised learning process to approach a satisfying result. For example, when the presently disclosed 3D GUI implements a supervised learning process, it will seek a function of Genie's trajectory (i.e., |$\overrightarrow{Path_{EG}}$| of FIG. 6) based on a former experience, i.e., a set of (input, output) data. Specifically, said input data has to do with the address of $E_G$ and the perspective angle $\delta_1$; said output data has to do with the dimensions of the targeted objects whose images are being projected on the displaying device 207W1$_{Displaying\ device}$ (e.g. |J'|, |K'|, and DJ'K', etc). FIGS. 10 and 11 denote a dilemma that an object (i.e., line $\overrightarrow{|J_{(2.5D)}K_{(2.5D)}|}$ is being "sandwitched" by two objects, i.e., circles $J_{(2.5D)}$ and $K_{(2.5D)}$. In this situation, as FIG. 11 shows, Genie may only have a fair chance to see the whole area of said two circles (i.e., J' and K) after it has changed the perspective angle from $\delta_1$ to $\delta'$. But Genie may not have a fair chance to see the whole profile of $\overrightarrow{|J'K'|}$ regardless said perspective angle is $\delta_1$ or $\delta'$, i.e., in both situations, there is a large portion of said line $\overrightarrow{|J'K'|}$ being blocked by the circle K'. Seeking a perspective angle that shows the whole length of line $\overrightarrow{|J'K'|}$ is literally impractical to a high caliber 3D GUI (or, it may require Genie 204 to travel a long distance to meet the goal, i.e., relocate from $E_{G0}$ to $E_{Gn}$ in FIG. 14). In this case, inference would be a more practical way for a viewer to comprehend a 3D scene. Referring back to FIG. 6, when $E_G$ is moved by a vector $\overrightarrow{E_1E_2}$, per the relative motion between $E_G$ and the origin of the coordinate system, circle $K_{(2.5D)}$ shall be moved by a vector $-\overrightarrow{E_1E_2}$. As to circle $J_{(2.5D)}$, per the same motion vector $\overrightarrow{E_1E_2}$ of $E_G$, it will be moved by a vector $$-\frac{|O_{(2.5D)}J_{(2.5D)}|}{|O_{(2.5D)}K_{(2.5D)}|}\overrightarrow{E_1E_2}.$$

The dissimilarity of said motion vectors of said circles $J_{(2.5D)}$ and $K_{(2.5D)}$ (i.e., morphing) denote a non-linear motion of the line linking them, i.e., $\overrightarrow{J_{(2.5D)}K_{(2.5D)}}$. When a 3D scene is presenting a plurality of objects that have various non-linear motions, it may infer the objects presented therein have unique gestures. Together the pattern and motion vectors of the objects constitute our preliminary comprehension of the world by visualization.

We now take the above stated envisioned "Fantasia® 3D" as an example. In this envisioned cartoon movie, each cluster of objects (e.g. flowers) denotes a unique class of objects, whose essential geometrical property (i.e., the graphical vectors) is denoted by their projected lengths on the $X_{(2.5D)}$ axis. Referring back to FIG. 9, circles A and A' are two objects being looked at by Genie (204) from different perspective angles ($\delta$). Per the above stated methodology, circles A and A' are denoted by two graphical vectors, i.e., $\overrightarrow{D_A}$ and $\overrightarrow{D_{A'}}$, respectively. As of such, the projected lengths of said two graphical vectors on the $X_{(2.5D)}$ axis are $\overrightarrow{D_A}\cdot\hat{X}_{(2.5D)}$ and $\overrightarrow{D_{A'}}\cdot\hat{X}_{(2.5D)}$, respectively. The magnitude of $\overrightarrow{D_A}\cdot\hat{X}_{(2.5D)}$ and $\overrightarrow{D_{A'}}\cdot\hat{X}_{(2.5D)}$ denotes the apparent sizes of said objects A and A'; that is, if they are relatively large, the essential porperties of said objects represented by said graphical vectors $\overrightarrow{D_A}$ and $\overrightarrow{D_{A'}}$, can be recognized by the viewer more easily, and vice versa. Referring now to FIG. 14, consider circles $J_{(2.5D)}$ and $K_{(2.5D)}$ as two clusters of flowers (in other words, the graphical pattern of said two clusters is not necessarily as simple as two circles), their essential features are denoted by the graphical vectors $\overrightarrow{D_J}$ and $\overrightarrow{D_K}$, respectively (we are using one vector to characterize each clusters of flowers; in fact, a GUI designer can use as many graphical vectors as he/she wants; as a rule of thumb, the more graphical vectors one uses to depict an object, the more detail a viewer can learn said object (especially its motions) from different perspective angle (the cost is the increased calculation power). As FIG. 10 shows, the projected lengths of said graphical vectors $\overrightarrow{D_J}$ and $\overrightarrow{D_K}$ on the X axis of the window (207W1), i.e., 207W1$_{displaying\ device}$ are $|\overrightarrow{J_{(2.5D)}}|$ and $|\overrightarrow{K_{(2.5D)}}|$, respectively. Eqs (22) and (23) depict the mapping process and dotting process associated to the above result. As one may notice, the projected lengths of circles $J_{(2.5D)}$ and $K_{(2.5D)}$ are keenly affected by the dot product between the $Z_{(2.5D,\ EG1)}$ axis and the unit vector of the $+X_{(2.5D)}$ axis of the 2.5D coordinate system shown in FIG. 6. Specifically, one may use the unit vectors of said two axes of 2.5D coordinate system to depict their mathematical relationship:

$$|\overrightarrow{J_{(2.5D)}}| = (\varphi: \overrightarrow{D_J} \to \overrightarrow{Z_{(2.5D,EG1)}})\cdot\hat{X}_{(2.5D)} = \quad (22)$$
$$|\varphi: \overrightarrow{D_J} \to \overrightarrow{Z_{(2.5D,EG1)}}|\times|\hat{X}_{(2.5D)}|\times\cos\delta_1 = |D_{J,Z(2.5D)}|\times\cos\delta_1$$

$$|\overrightarrow{K_{(2.5D)}}| = (\varphi: \overrightarrow{D_K} \to \overrightarrow{Z_{(2.5D,EG1)}})\cdot\hat{X}_{(2.5D)} = \quad (23)$$
$$|\varphi: \overrightarrow{D_K} \to \overrightarrow{Z_{(2.5D,EG1)}}|\times|\hat{X}_{(2.5D)}|\times\cos\delta_1 = D_{K,Z(2.5D)}\times\cos\delta_1$$

Where $\phi$ is a function that maps the graphical vectors $\overrightarrow{D_J}$ and $\overrightarrow{D_K}$ to $Z_{(2.5D)}$ axis, $\hat{X}_{(2.5D)}$ is the unit vectors of the $X_{(2.5)}$ axis; $|\overrightarrow{J_{(2.5D)}}|$ and $|\overrightarrow{K_{(2.5D)}}|$ are the apparent sizes of said two clusters of flowers circles as perceived by Genie (204). So, Eqs. (22) and (23) justify what we have discussed before that a means of 3D graphical rendering is keenly affecting the level of comprehension of a viewer.

Of course, the above disclosed methodology can be applied to more than two objects in a screen. In this section we elaborate that when a data analyst intends to separate a plurality of objects into a few classes (not necessarily graphical ones), whose essential features can be characterized by some characteristic vectors (e.g. hue index, genome, etc.), according to the theorem of SVM (the "support vector machine"), the analyst may first map said characteristic vectors to a feature vector space that has its dimensions higher than that of the graphical vectors; the dotting process may proceed afterwards. In the above stated case, Genie (204) is intended to separating a plurality of objects (e.g. clusters of flowers) by a specific perspective angle; namely, said separating process is carried out by a dotting process from the $\hat{Z}_{(2.5D,\ EG1)}$ axis to the $\hat{X}_{(2.5D)}$ axis. The entire process is literally a machine learning one that aims to divide a plurality of objects into multiple classes. What is important to be acknowledged is said dotting process is keenly related to the 2.5D coordinate system embedded in the images captured by our retina, which is a literally a 2D organ. So, the presently disclosed invention denotes a revolutionary technology for a computer or electromechanical system to engage with the user, in which certain 3D patterns, i.e., the essential features of the objects, etc., can interact with the users by the deliberately adjusted perspective angles of a 2.5D coordinate system. Here the readers must be advised that a 3D object has three degrees of freedom for its whereabout (i.e., X, Y, and Z); in the mean time, it has six degrees of freedom for the respective motions in the same space; these fundamental properties will all be taken into account by the presently disclosed 3D GUI (207).

The above stated method of depicting a plurality 3D objects by carefully controlling the way their graphical vectors are presented to the viewer (e.g. $|\vec{J}_{(2.5D)}|$, $|\vec{K}_{(2.5D)}|$, etc.) is implemented by computing the dot products between the unit vector of X and Z axes of a 2.5D coordinate system (i.e., $\hat{X}_{(2.5D)}$ $\hat{Z}_{(2.5D)}$; this methodology mimics the kernel trick used by SVM. As has already been demonstrated in the earlier paragraphs, the fundamental value of the kernel trick is attributed to its capability of taking the dot products of the feature vectors, which is extracted from the graphical vectors. Here the presently disclosed invention extends the utility of SVM by exploiting the strong relationship between the 3D coordinate system of the real world and a 2.5D coordinate system used by a graphic rendering feature (i.e., 3D GUI). This is indeed a gift that Mother Nature gives to humans. If counted by numbers, most of the creatures in nature use compound eyes; in their compound eyes, the photo receptors are wired to the neurons in direct ways—although this makes compound eyes more responsive to the optical flows in ambient light (i.e., making said creatures escape from predators more easily), these creatures' level of comprehension of their surroundings is far lower than that of human being—this fundamental drawback has to do with the missing dotting process in their respective neural systems (having no 2.5D coordinate system, thereby having no way to adjust the perspective angle to assess the similarity among different graphical entities). In the present disclosure, we are using SVM (616) to elucidate the fundamental advantages of using artificial intelligence for reinforcing a viewer's capability of learning/interacting with a 3D scenery. In the AI industry, there are other methodologies that can do similar jobs; this disclosure does not rule out the options of using them.

In the above paragraphs, the disclosure focused on elaborating the unique methodology developed to reinforce a viewer's learning experience through interaction with 3D scenery. In the latter paragraphs of this section, the presently disclosed 3D GUI focuses on elaborating the means to make a computer's, (a machine's) learning experience or interaction with a 3D scenery proceed effectively. FIG. 5A shows an exemplary graphical rendering process of the presently disclosed 3D GUI. A cursor (1707A) is approaching two roses, i.e., (1701L) and (1701R), the 3D geometrical patterns of the roses are quite complicated in that there are many petals in each rose; if a GUI is meant to use the conventional methodology to sketch these petals, a most common method is using the polygon network (see FIG. 10A in application Ser. No. 16/056,752 e.g. vertex 1010 of FIG. 10B). The position and orientation of the respective vertexes of said polygon network may serve as the nodes that engage with an operator/cursor to modify the associated 3D graphical pattern (e.g. 1001). Such a method works fine for static models, but it may not be suitable to continually modifying a polygon network when the processing time/power of an application is limited (this is a typical case for video games). As one can imagine, continually modifying the position, i.e., $P_2$ ($X_{F2}$, $Y_{F2}$, $Z_{F2}$), and orientation (e.g. the parameters 1709) of a large number of vertexes imposes a heavy load on the CPU and GPU; the processing time required for such a task can be extended when the number of said vertexes is quite large. To cope with this problem, the presently disclosed 3D GUI may extract a few graphical vectors/motion vectors from said roses (e.g. the normal vector $N_{1701L}$, 1712, and 1713, etc.) to meet the goal. Using selected graphical vectors/motion vectors of an object (e.g. 1701L) to engage with a 3D cursor (1707A) may make the processes of calculating the effect of an engagement much more efficient, and this capability not only can reduce the number of the vertexes to be processed, but also the enhanced comprehension of the interaction by the viewer (result is more predictable and understandable).

Here the readers are advised that both 3D graphical vector (e.g. normal vector $N_{1701L}$) and 3D motion vector (denoted by the coordinate system 1707 of cursor 1707A) can be denoted by the matrices having the same dimensions (e.g. 3×3). Thus, a straightforward matrix multiplying process (e.g. multiplying the normal vector $N_{1701L}$ to said motion vector of cursor 1707A, etc.) may generate the resultant motion vector in a relatively short period of time. In the presently disclosed 3D GUI, one can execute this kind of process for the graphical object (e.g. the petal of the rose 1701R) that are selected for cursor engagement; the ones that are not selected can be waived for such a process. By designating objects for said matrix multiplying process, the interaction between a portion of a complicated large object (e.g. petals of rose 1701R) and said cursor (1707A) would be calculated out in a locally constrained manner, which can be much faster and understandable to the user. In Eq. (3), the presently disclosed invention demonstrates that the parameters n, a, and s, of the matrix T can be used to denote the normal vector, sliding vector, and approaching vector of an end effector of a robot. In FIG. 5A, we are using two local coordinate systems, i.e., (1708) and (1709), to denote the matrixes of each of said roses (1701L) and (1701R) respectively. So, by multiplying matrix (1707) with (1708), or multiplying matrix (1707) with (1709), based on Eq. (3), the presently disclosed 3D GUI is able to generate many kinds of interactions between said cursor (1707) and said roses (e.g. 1701L or 1701R), with their respective results predicable and understandable by the operator. To further make such an interaction sensitive to the distance between said roses and said cursor (1707), the presently disclosed 3D GUI has allocated three zones of engagement, each of which denotes a different level of engagement (i.e., (1702), (1703), and (1704). As FIG. 17A shows, zone (1702) is dedicated to rose (1701L), zone (1703) is dedicated to rose (1701R), and zone (1704) is dedicated a region that engages both roses (1701L) and (1701R). Note that these zones are by and largely related to the relative distances between the centroids of said roses (i.e., $P_1$ ($X_{F1}$, $Y_{F1}$, $Z_{F1}$) and $P_2$ ($X_{F2}$, $Y_{F2}$, $Z_{F2}$) and said cursor (1707). As an example, when said cursor is moved from (1707A) to (1707B), its tip, i.e., $P_c$ ($X_c$, $Y_c$, $Z_c$), enters the effective zone of engagement (1704), so the presently disclosed 3D GUI (207) will wake up the associated processes of interactions for both roses (1701L) and (1701R), such as swaying, etc. When the cursor (1708) is further approaching either zone (1703) or (1704), the level of engagement between said cursor and one of the roses (i.e., either rose (1701L) or (1701R) will be enhanced; certain actions such as flower blooming may proceed accordingly. When the presently disclosed 3D GUI is engaging with a fairly large number of objects (e.g. the number of said roses is hundreds, or thousands, etc.), and said objects may be changing their respective patterns or colors during the course of engagement, designating so many zones of engagement to each flower may not be a practical way of processing. To cope with this problem, the presently disclosed 3D GUI (207) uses artificial intelligence (e.g. SVM, Convolutional Neural Network, CNN, etc.) to classify some of the objects by their respective graphical vectors(which may comprise the color indexes as well), images, and motion vectors. FIG. 5A shows an exemplary feature vector space established by the selected graphical vectors and motion vectors of roses (1701L) and (1701R). In certain applications, said feature vectors can be established by a set of realistic data (e.g. images, etc.) that are measured by an instrument (e.g. DICOM data, a set of image data in JPG format; DICOM is the standard for the communication and management of medical imaging information and related data) rather than being generated by any 3D graphical vectors, the stated above artificial intelligent means (e.g. a process module 610 that carries CNN feature, etc.) still can work effectively and efficiently, i.e., classifying the respective objects in the presently disclosed 3D GUI (207), with the occasional help of human judgment. In the following, for the brevity of explanation, we use the graphical vectors to illustrate the merit of the presently disclosed invention. Nevertheless, readers are advised that such a simplified way of narration does not rule out the utilities of the other types of data, such as the realistic images. As FIG. 5B shows, using the kernel trick taught in the former paragraphs (i.e., mapping said vectors to a higher dimensional space), the roses fall into the class of (1701L), which are denoted by the spots in FIG. 5B, and the ones falling into the class of (1701R), which are denoted by the asteroids (stars) in FIG. 5B, can form a distinct boundary (1711) in the feature vector space (denoted by the coordinate system $X^{d(d>3)}$-$Y^{d(d>3)}$; thus, using a hyperplane (1710), the presently disclosed 3D GUI can determine which class of said roses is engaging with the cursor (1707). At this stage (i.e., FIGS. 5A and 5B), the interaction between an operator (i.e., cursor 1707B) and a 3D vector graphic in the presently disclosed 3D GUI (e.g. the rose 1701L or 1701R of FIG. 5A) is denoted by matrix operations (e.g. multiplying 1707, 1708, and 1709, which are all 3×3 matrixes). The resultant matrix still is a matrix; it denotes multiple interactions between an operator, which in effect is the 3D cursor (e.g. 1707B) in the presently disclosed 3D GUI (207), and said 3D vector graphic (e.g. rose 1701 L or 1701R). FIGS. 5C and 5D further depict the neural signal processing steps taken by the presently disclosed 3D GUI (207) for an operator (i.e., the cursor 1707B) to engage with a 3D vector graphic (i.e., 1714; as has been stated in the above, 1714 may also denote a set of data pertaining to a realistic object; for easier explanation, we use the vector graphics to proceed with the following explanation). As FIG. 5D shows, the content or context of a 3D vector graphic (1723) can be denoted by a plurality of 3D features, e.g. eyes, lips, etc. To extract said 3D features, the presently discoed 3D GUI designates a few 3D zones (e.g. 1723D1, 1723D2, 1723D3, and 1723D4, etc.) in said 3D vector graphic (1723). As FIG. 5D further shows, within each said 3D zone, a 3D feature is constructed by a set of 3D graphical vectors (e.g. 1723VG-X). When any of said 3D graphical vectors changes its properties (e.g. length, direction, color index, . . . etc.), said 3D features shall be adjusted accordingly. In practice, a GUI designer can designate many subtle variations to said 3D graphical vectors (e.g. 1723GV-X), the corresponding 3D features can be used to denote a rich set of facial expressions (e.g. sad, happy, etc.) of said human head (1723). In the present invention, the variations of the feature vectors derived from said graphical vectors are denoted as being the neural input signals; the variations of said human expression are denoted as the final neural output signal. Within the presently disclosed 3D GUI, there may be several layers of neural nodes (e.g. 1716) that are arranged in a serial manner or parallel manner to process said neural input signals (this type of multilayered processes of neural signals denotes deep machine learning). During operation, the presently disclosed 3D GUI first converts said features (i.e., a set of graphical vectors) into a plurality of neural input signals; when said neural input signals pass through said layers of neural nodes to become the final neural output signals, some functions in the presently disclosed 3D GUI may be activated or inactivated in accordance with the final neural output signals; thus, the operator of the presently disclosed 3D GUI gets an impression that a computer carrying the presently disclosed 3D GUI (207) is able to perform some intelligent functions based on the neural signals, e.g. the variation of the facial expression of said human head (1723). For example, when the expression of said human head (1723) is happy, a cheerful background music can be played; when the expression of said human head (1723) is sad, a consoling background music can be played. In the presently disclosed 3D GUI, there is a 3D cursor (1707B) that facilitates the interactions between the operator and said vector graphic (1714); this 3D cursor (1707B) is different from the one used by the prior art (e.g. a cursor in a 2D GUI) in that it designates a 3D zone (1707C) instead of merely a point in the 3D space to interact/engage with a 3D graphical entity (e.g. a 3D feature). When a 3D cursor (1707B) accesses a 3D zone (e.g. 1723D1, 1723D2, 1723D3, or 1723D4), the features contained therein can be adjusted by the operator (i.e., by forms of matrix operation); this denotes that the presently disclosed 3D GUI has effective means to manipulate the above stated neural signals. In practice, said 3D zone (e.g. 1723D1) may have a specific pattern (e.g. rectangular box with specific length, width, and height) that is designated by the presently disclosed 3D GUI, but they can be changed whenever the operator requires. FIG. 5C shows the typical steps that the presently disclosed 3D GUI takes to process said neural input signals. When a 3D cursor (1707B) picks out a 3D zone (e.g. 1707C) for analysis, it creates a neural input signal as stated in the above; the typical methods comprise using the techniques such as convolutional neural network (CNN) to derive the signals 1714-1, 1714-2, 1714-3, 1714-4, etc.) Typical CNN functions are hyperbolic tangent function, sigmoid function, etc. In the presently disclosed 3D GUI, or more specifically, the Neural Network internal process module (610) in FIG. 3B, layer such as (1714S) can be called the CNN layer; the remaining layers (e.g. 1715, 1716, 1717, etc.) may carry similar functions, but occasionally they may remove said convolutional functionality as an attempt to save the processing power. The merit of CNN is like applying a non-linear function on the raw input data (e.g., a 3D vector graphic, or a set of DICOM images, etc.), which may help the presently disclosed 3D GUI to extract certain features (e.g. corners, serifs of texts, or a type of medicine flowing in an organ, etc.) from the 3D vector graphics more reliably. In the present invention, the neural input signals of said 3D zones (1714-1, 1714-2, 1714-3, 1714-4, etc.) are also called the feature vectors; contextually, a vector graphic (e.g. human head 1723) can be denoted by a plurality of said feature vectors. Likewise, in a medical image, there could be a plurality of feature vectors embedded therein. Take FIG. 5C as an example, the feature vectors are, respectively, 1714-1, 1714-2, and 1714-3; together, said feature vectors construct a feature vector space (1714S) whose dimension can be very high. Within the internal process module of the Neural Network (610), FIG. 4B, several neural input signals can be linked to a common neural node to denote their combined effect; in a deep learning machine (e.g. CNN), an output signal per said combined effect can be linked to the input of another neural node; by doing so repetitively, a layered structure of a neural network can be formed. When said neural signals are propagating through said layers of neural nodes, some unique functions can be applied to the respective neural signals to enhance/suppress their influences on the final neural output signals. For example, the feature vectors (e.g. 1714-1, 1714-2, etc.) of FIG. 5C can be processed by the Kernel functions $K_x$ (i.e., 1715, x=1~n). Still further, the feature vectors after being processed by said Kernel functions $K_x$ can be adjusted by the weight factors $W_x$ 1717 (i.e., multiplying $W_x$ to the output signals of first layer neural node 1716). Still further, the Neural Network module (610) can adjust the threshold value (not shown) for each of the respective neural nodes. In the exemplary case of FIG. 5D, there are four 3D zones in the human head 1723 (i.e., 1723D1, 1723D2, 1723D3, and 1723D4, respectively); said four 3D zones may denote four neural input signals of a neural network, thereby four feature vectors (1714-1, 1714-2, 1714-3, and 1714-4) are generated in the corresponding feature vector space (1714S). Applying the knowledge learned from support vector machine, when said Kernel functions $K_x$ (1715) and said weight factors $W_x$ (1717) are set at proper conditions, an entire feature vector space can be represented by (1725). As FIG. 5C shows, within said feature vector space (1725), the feature vector (1719-1) denotes a final neural output signal that is located on the right side of the hyperplane (1721), which actually designates a unique status of the neural network (610). Likewise, the feature vector (1719-2) is a final neural output signal that is located on the left side of the hyperplane (1721), which actually designates another status of the neural network (610) that is different from that of (1719-1). As FIG. 5C shows, said two status of neural network (610) are separated from one another by two margin lines (1718-1 and 1718-2); the gap between said two margin lines is denoted by two unique feature vectors which belong to the opposite classes but are the closest to one another (i.e., 1719-1 and 1719-2) among all feature vectors. When said gap of margin is wide enough to be recognized clearly by the internal process module of support vector machine (616), the corresponding neural output signals (i.e., all feature vectors in 1725) can be used to turn on or off certain functions of a computer or electronic system accurately and reliably.

In practice, the format and resolution of said feature vector can have many varieties (e.g. a real number between zero and one, etc.). For example, a feature vector 1714-2 (x, x=0.0~4.0; y, y=0.0~1.0) can be used to denote a neural signal data that represents the condition of the left eye (1723D2) of the human head (1723). Likewise, the feature vector 1714-1 (x, x=0.0~1.0; y, y=0.0~1.0) can be used to denote a neural signal data that represents the condition of the right eye (1723D1) of the human head (1723). When a neural node combines the above two neural input signals with different weight factors (e.g. $W_x$ 1717), it may generate a variety of neural output signals; extend this scenario to a fairly large number of neural input signals, the vast varieties of the corresponding neural output signals can be used to denote very complicated conditions (e.g. facial expression of said human head 1723 in a mood of sad, happy, pondering, frowning, frightening, etc). When the number of said neural input signals is very large (e.g. there are far more feature vectors than 1714-1, 1714-2, 1714-3, and 1714-4), we may characterize their corresponding vector space (1714-S for the input signals, 1725 for the output signals) as a high dimensional one. The advantages and drawbacks of a very high dimension feature vector space is the following. When said dimension is very high, it denotes an advantage that the presently disclosed 3D GUI (207) is able to generate many functions based on the status of said neural output signals. Prior art (i.e., conventional GUI) has never reached such a profound level of interaction between an operator and a 3D GUI. The fundamental drawback for a neural network having very high dimensional feature vector space is the processing load on the CPU and GPU is increased drastically. To accommodate the issue that said dimension of feature vectors may vary in different applications, the presently disclosed 3D GUI (207) may temporarily disable the neural nodes that are un-used as a contingent way of reducing the processing load of the CPU and GPU. For example, the 3D zones (1723D4) is located on the back of said human head (1723); it can be used to denote the hair of said human head (1723), e.g. curl, straight, trimmed, etc. When an interaction between the user and the presently disclosed 3D GUI (207) has nothing to do with hair, the processing steps of generating the neural signals associated with the 3D zones (1723D4) can be temporarily disabled, this in turn increases the processing speed of the neural network module (610). When the above method is un-enough to tackle the situation (e.g. said 3D vector graphic 1723 is relatively complicated), the presently disclosed 3D GUI (207) uses graphical means (i.e., perspective sketching) to reduce the dimension of said feature vector space.

At this stage, the 3D vector graphic (1723) of FIG. 5D is still in 3D formation, i.e., all the features contained therein, and their respective graphical vectors, are denoted by the X, Y, and Z values of a 3D coordinate system. Upon assessing the content or context of a 3D vector graphic by neural network, the presently disclosed 3D GUI (207) provides a unique and convenient means to reduce the dimension of a vector graphic (e.g. 1723) from 3D to 2.5D without deteriorating the performance of the neural network module (610) too much; by doing so, the overall performance (e.g.

speed, power consumption, etc.) of the presently disclosed 3D GUI (207) can be increased without losing the accuracy of assessing the respective neural input signals. Before we elaborate such a unique feature in further detail, we may refer back to the section 6.7 of 16/056,752 to recite the methodology used by the presently disclosed 3D GUI (207) to manipulate the apparent dimension of a vector; specifically, said method has to do with the perspective sketching techniques. As is discussed in section 6.7 of related application Ser. No. 16/056,752, which is fully incorporated herein by reference, the presently disclosed 3D GUI is able to manifest the sensation of three dimension of a 3D scenery by classifying its graphical vectors in accordance with the perspective angles (i.e., aligning some edge lines to the vanishing points and/or vanishing lines). From a mathematical point of view, this feature is in fact the result of a mapping process from a 3D vector graphic to a 2.5D one. As section 6.7 of 16/056,752 further explained, the location of the vanishing points and vanishing lines in a perspective graphic (e.g. FIG. 10J in that application) affects the viewer's comprehension profoundly. Such a rule of graphical sketching also affects the level of comprehension of a machine that uses artificial intelligence to assess the content or context of a 3D vector graphic, or a 3D image acquired by instrument; the fundamental reason is that a 2.5D graphical perspective sketch bears the fundamental capability to control the sensation of three dimension of a 3D scenery, regardless of whether the viewer is a live person or a machine. Applying this methodology to the current section, the presently disclosed 3D GUI maps the 3D graphical vectors (e.g. 1723GV-X) of the vector graphic (1723) to a 2D image frame (i.e., 1724); by deliberatively choosing the locations of the respective vanishing points (i.e., VP1, VP2, and VP3), the processing load on the neural network module (610) is greatly reduced. In order to illustrate such a merit clearly, a contour box (1723-CB) is added to FIG. 5C to denote several principal graphical vectors therein, i.e., (1722-X), (1722-Y), and (1722-Z). These principal graphical vectors have dual utilities; as FIG. 5C shows, said principal graphical vectors (1722-X), (1722-Y), and (1722-Z) are the normal vectors of the three facets of said contour box 1723-CB (thereby they are the X, Y, and Z axes of the coordinate system of said contour box); in this respect, said principal graphical vectors are 3D graphical entities. On the other hand, said three principal vectors can be projected onto the 2D image frame (1724); in this respect, said principal graphical vectors (1722-X), (1722-Y), and (1722-Z) are 2D graphical entities representing the vanishing lines of the 2.5D coordinate system. Once said vanishing lines have been projected onto said 2D image frame (1724), the remaining 3D graphical vectors (e.g. 1723GV-X) may follow the same processing steps to map themselves onto said 2D image frame (1724). Thus, when the neural network process module (610) is extracting feature vectors from the image frame (1724), the vector graphic contained therein appears to the viewer as being a 3D graphic (e.g. 1723), but it is already a 2.5D graphical entity. In our discussions in 16/056,752 fully incorporated herein, we have explained that vanishing points (e.g. VP1, VP2, and VP3, etc.) are used by the graphical artists to denote the converging effect of the basic graphical element (pixel or voxel) in a 2.5D perspective sketch. When we take this graphical art to a physicist, we will receive the explanation that the degrees of freedom of the pixel or voxel in said 2.5D perspective sketch are decreasing in accordance with their distance to said vanishing points. Conventional GUIs do not know all this; they are treating each pixel or voxel as mathematical points, to which size and direction are irrelevant. The presently disclosed 3D GUI treats each pixel or voxel as a real object. In the present disclosure, the mathematical formulas denoting the relationship among the X, Y, and Z values of a 2.5D coordinate system are Eqs (16) and (17). As is stated in the above, when a 3D vector graphic is projected onto a 2D image frame (e.g. 1724) by way of perspective sketching, the degrees of freedom of the respective pixels decrease in accordance with a unique profile designated by said vanishing points. After the presently disclosed 3D GUI (207) has projected the 3D graphical vectors (e.g. 1723GV-1) onto said 2D image frame (1724), the features contained in the respective 3D zones (e.g. 1723D1) have all been transformed into 2D ones (more specifically, 2.5D ones). When the dimension of a graphical vector is reduced (i.e., from 3 to 2.5), the dimension of the corresponding feature vectors will be reduced accordingly. In FIG. 5D, we use Kernel function $K_x$ to reduce the dimension of the feature vectors. In the earlier paragraphs of the present section, we have explained that the fundamental merit of the Kernel function of an SVM is equivalent to the dotting process of two vectors (exemplary ones are Eqs 11 through 15). In FIG. 6, we have demonstrated that manipulating the perspective angle of a graphical entity (e.g. $J_{2.5D}$, $K_{2.5I}$)) in a 2.5D displaying device (207W1) as shown in FIG. 10 is equivalent to performing the dotting process between the graphical vectors (e.g. $\vec{D}_J$ and $\vec{D}_K$) and the unit vector of its $X_{(2.5)}$ axis Applying these understandings to FIG. 5D, the presently disclosed 3D GUI generates a unique Kernel trick; this Kernel trick uses geometrical means (not the algebraic ones as Eq. 11 through 15 have shown) to map a 3D vector graphic (e.g. 1723) onto a 2.5D image frame (1724). When a vector graphic lying in a 2D image frame (e.g. 1724) uses a 2.5D coordinate system to represent the 3D graphical vectors, we call such a graphical vector a 2.5D one; the feature vector and vector graphic derived from said 2.5D vector graphic henceforth are 2.5D one as well. Thus, the methodology developed by the present invention (i.e., a Kernel trick of SVM developed from perspective sketching) is a straightforward and powerful way to reduce the total dimension of the feature vector space generated from a raw 3D vector graphic (e.g. 1723), or a set of data (e.g. DICOM) that denote an object in the 3D space. To appreciate the merit of such a methodology from physical point of view, one has to first understand the essential properties of the vanishing point. As has been explained previously, a vanishing point does not carry any information pertaining to size or directionality; that is, at a distance between the viewer and said vanishing point that is relatively large, there is no way for said viewer to differentiate two neighboring objects, this denotes that the apparent degree of freedom of said vanishing point is literally zero. Thus, transforming a 3D vector graphic into a 2.5D one in accordance with the rule of perspective sketching is a very powerful method to generate the features that appear to the viewer as the 3D ones, but in reality the dimensions of said feature vectors have been reduced. There is a side effect on this methodology: the contour smearing effect may take place when said Kernel trick is overly done. Nevertheless, by carefully Choosing said perspective angle, the presently disclosed 3D GUI (207) can control said contour smearing effect to a reasonably low level. Enlightened by the vector classifying power of SVM, and the finesse used by the graphical artists of impressionism, the presently disclosed 3D GUI (207) adds a few vanishing points (e.g. VP1, VP2, and VP3) to a 3D vector graphic (e.g. 1723) as an unprecedented means to reduce the dimension/resolution of the corresponding feature vectors.

Buttressed up by the collaborations with the internal process module of Perspective (607), and the support of the internal process module of Support Vector Machine (616), the dimensions of the feature vector space is reduced effectively and certain unique sensations of graphics may be rendered to the viewer; in this situation, the performance of the presently disclosed 3D GUI (207) has been enhanced profoundly.

Readers are advised that a feature vector does not always have to be derived from the graphical vectors (e.g. 1723GV-X); there are other signals such as the realistic images, sound (e.g. multi-channel sound) or motion vector . . . etc. that can serve as the source of a feature vector. As has been stated in the earlier paragraph of this section 6.2, when a 3D scene is presenting a plurality of objects that has various non-linear motions, it may infer the objects presented therein have unique gestures. Together the pattern (i.e., features in a vector graphic) and motion vectors of the objects (some motion vectors can be generated by the presently disclosed 3D GUI directly) constitute our preliminary comprehension of the world by visualization.

Note that the magnitude and direction of the motion vectors of the objects engaging with the cursor (1707) will not be affected by the perspective angle. In other words, while an operator is using cursor (1707) to engage with the 3D objects, Genie (204) can move around to seek the best perspective angle to present the result freely—the two processes (i.e., object engagement and perspective angle adjustment) are not interfering with one another.

Based on the above scenario, one comes to an understanding that, supported by the extraordinary machine learning capability of the prsently disclosed 3D GUI (207), the interaction between an operator and the objects presented/contolled by a 3D graphical rendering system using the presently disclosed 3D GUI, such as a movie player of "Fantasia® 3D", a 3D medical image rendering system, a graphic sketching system, or a manipulator of a sophisticated robot, etc., would be far more intuitive and pervasivethan its predecesors are, and this merit has gone beyond the scope of intelligent perspective angle adjustment.

As is understood by a person skilled in the art, the sections of the present disclosure are illustrative of the present disclosure rather than being limiting of the present disclosure. Revisions and modifications may be made to methods, processes, materials, structures, and dimensions through which is made and used a 3D GUI that imparts linear and nonlinear motion vectors corresponding to different degrees of freedom of a 3-dimensional object to its basic graphical elements, such as pixels, voxels, or to a complete 3D maneuverable system such as a robot and includes the artificial intelligence methodology of machine learning (ML), support vector machine (SVM), and convolutional neural network (CNN) to enable a more complete, yet comprehensible control of complex systems such as 3D graphics and robots, while still providing such methods, processes, materials, structures and dimensions in accordance with the present disclosure as defined by the appended claims.

I claim:

1. A system comprising:
a memory and at least one processor coupled to the memory;
wherein said system is configured to display a three-dimensional (3D) graphical user interface (3D GUI) on a 3D graphical rendering device; wherein said 3D GUI is configured to enhance a user's experience of engaging with 3D scenery represented on said 3D graphical rendering device, said 3D scenery comprising a plurality of 3D objects whose properties are represented by a subset of 3D graphical vectors within a set of such vectors that have more than three degrees of freedom, said set of vectors having a volume in a 3D space, or properties associated with a set of data measured by an instrument; wherein
said subset of 3D graphical vectors or said set of data measured by said instrument are represented in a coordinate system that has at least three dimensions;
wherein said system is configured to enable its operator to adjust a perspective angle within a two-and-a-half-dimensional (2.5D) coordinate system embedded in said 3D graphical rendering device; wherein
said perspective angle is an angle of intersection with the X and Z axes in said 2.5D coordinate system, or an angle of intersection with the X and Y axes in said 2.5D coordinate system, or an angle of intersection with any of two axes of a 2.5D coordinate system that are orthogonal to one another;
wherein said system is configured to enable said operator to apply an artificial intelligence (AI) functionality that uses a machine learning process to classify into several separable classes, visually or by other sensory or cognitive modes, a plurality of said 3D subset of graphical vectors or said set of data measured by said instrument;
wherein said 3D subset of graphical vectors or said set of data measured by said instrument are associated with a feature vector space and are used by said system to denote said 3D objects;
wherein separate properties associated with motion vectors, graphical vectors, or relative distances between elements of a set of said 3D objects or a set of data that is measured by said instrument, are classified into the same class by said system;
wherein each of said separate properties is controlled by a relationship, wherein said relationship is expressed as a function of the magnitude of said perspective angle, and said magnitude of said perspective angle is adjusted for each said class.

2. The system of claim 1:
wherein said system is configured so that said process of classifying motion vectors, graphical vectors, relative distances among said 3D objects, or said set of data that is measured by said instrument, reaches an optimal condition at a specific perspective angle.

3. The system of claim 1:
wherein said process of classifying reaches an optimal condition by designating an initial 3D position of a world space camera, followed by series of translational motion vectors and rotational motion vectors of said world space camera.

4. The system of claim 1:
wherein said process of classifying reaches an optimal condition by using a neural network and machine learning as a trajectory analyzing process by said system without allowing any 3D object to conduct any realistic movement during said trajectory analyzing process.

5. The system of claim 1:
wherein a leading index of performance used by said 3D graphical rendering device or means of 3D rendering is defined, wherein said leading index of performance comprises a metric that allows said system to seek an optimal performance by assessing the influence of a small variation of said perspective angle on the movement of an object presented therein, wherein the magnitude of said small variation is large enough for said system to identify its impact on a performance relating to said 3D rendering, but not large enough to cause physiological perturbations to a viewer.

6. The system of claim 1:

wherein a transformation from a 3D coordinate system to a 2.5D coordinate system is made by using a "kernel trick," whereby the transformation from a 3D system representation of a graphical object to a 2.5D system representation of the same said graphical object is the result of manipulating the respective perspective angle appropriately; wherein the process of said manipulating, is accomplished using the kernel functions $K_1$ and $K_2$ as shown in the following equations:

$$K(x \cdot x') = K_1(x \cdot x') + K_2(x \cdot x')$$

$$K(x \cdot x') = (x \cdot x')$$

$$K(x \cdot x') = K_1(x \cdot x') \times K_2(x \cdot x')$$

$$K(x \cdot x') = x^T A x'$$

$$K(x \cdot x') = K_1(f(x) \cdot f(x')).$$

7. The system of claim 1 wherein said relationship between differential motions in a three-dimensional (3D) space and their corresponding motions in a 2.5-dimensional (2.5D) projected space is expressed in differential form as follows:

$$dX_{displaying\ device} = dX_{(2.5D)} + dZ_{(2.5D)} \cdot \cos(\delta) - Z_{(2.5D)} \sin(\delta) d\delta$$

$$dY_{displaying\ device} = dY_{(2.5D)} + dZ_{(2.5D)} \cdot \sin(\delta) - Z_{(2.5D)} \cos(\delta) d\delta$$

wherein said differentials express the variation of the coordinates of a graphical vector ($X_{displaying\ device}$, $Y_{displaying\ device}$) in a 2.5D space that is projected on the screen of a displaying device when a perspective angle $\delta$ as visualized by the user of said displaying device undergoes a variation dci.

8. The system of claim 7 wherein said relationship, when using the functionalities of AI, takes into consideration the effects of occlusion wherein intervening objects block the line of sight as the angle of perspective undergoes said variation d$\delta$ and whereby an optimal perspective can be obtained.

9. The system of claim 8 further comprising an electro-mechanical system coupled to said system, wherein said electro-mechanical system is a maneuverable aircraft configured to receive external signals and, using an internal AI functionality, to convert them into appropriate responses that control the path of the maneuverable aircraft through a three-dimensional (3D) space comprising a multiplicity of 3D objects.

10. The system of claim 1 further comprising an electro-mechanical system coupled to said system, wherein said electromechanical system is a mobile, maneuverable robot that is externally controllable by said operator of said system or is under the influence of internal sensors, wherein said mobile, maneuverable robot's visual space is controllably altered as said robot undergoes external rotations, thereby creating accurate visual images of its position, internally, for autonomous operation, or, externally, for control by said operator, wherein said visual images are continually altered corresponding to associated changes in a perspective angle.

11. The system of claim 1 wherein reducing the dimensionality of the coordinate system from 3D to 2.5D, without any deterioration of the functionality of a neural network, reduces the power consumption of the system.

* * * * *